(12) United States Patent
Densel et al.

(10) Patent No.: US 7,832,774 B2
(45) Date of Patent: Nov. 16, 2010

(54) COUPLING ASSEMBLY

(75) Inventors: David S. Densel, Whitehouse, OH (US); Matthew M. Persohn, Toledo, OH (US)

(73) Assignee: Eaton Corporation, Cleveland, OH (US)

(*) Notice: Subject to any disclaimer, the term of this patent is extended or adjusted under 35 U.S.C. 154(b) by 1071 days.

(21) Appl. No.: 10/460,938

(22) Filed: Jun. 13, 2003

(65) Prior Publication Data

US 2004/0070197 A1 Apr. 15, 2004

Related U.S. Application Data

(60) Provisional application No. 60/388,869, filed on Jun. 14, 2002.

(51) Int. Cl.
*F16L 37/00* (2006.01)

(52) U.S. Cl. .......................................... 285/308; 285/39

(58) Field of Classification Search ................... 285/39, 285/321, 307, 308, 317, 315, 924, 921, 36
See application file for complete search history.

(56) References Cited

U.S. PATENT DOCUMENTS

| | | | | |
|---|---|---|---|---|
| 3,345,084 | A * | 10/1967 | Hanes et al. ................... 285/39 |
| 3,442,541 | A * | 5/1969 | Metz ........................... 285/317 |
| 3,827,728 | A * | 8/1974 | Hynes .......................... 285/90 |
| 4,172,606 | A * | 10/1979 | Howe ........................... 285/34 |
| 4,411,455 | A * | 10/1983 | Schnatzmeyer .............. 285/39 |
| 4,830,408 | A * | 5/1989 | Reimert ........................ 285/27 |
| 4,903,992 | A * | 2/1990 | Jennings et al. ............. 285/307 |
| 4,906,031 | A * | 3/1990 | Vyse ........................... 285/318 |
| 4,923,227 | A | 5/1990 | Petty et al. |
| 5,005,877 | A * | 4/1991 | Hayman ....................... 285/317 |

(Continued)

FOREIGN PATENT DOCUMENTS

DE 195 17 269 A1 11/1996

(Continued)

OTHER PUBLICATIONS

International Search Report (3 pages).

(Continued)

*Primary Examiner*—Aaron Dunwoody
(74) *Attorney, Agent, or Firm*—Benesch Friedlander Coplan & Aronoff LLP

(57) ABSTRACT

A coupling assembly is disclosed that includes a first member and a second member having a receiving portion sized to receive the first member. A retaining formation is provided on one of the first and second members. The retaining formation includes a ramp and two or more grooves, wherein each groove is at least partially defined by converging surfaces. A locking member is moveably secured in a cavity in the other of the first and second members. The locking member is configured to be moved in a first radial direction by the ramp upon movement of the first member into the second member. The locking member is also biased in a second radial direction opposite the first radial direction into a groove in the retaining formation to become positioned between a converging surface on the retaining formation and the cavity upon further movement of the first member into the receiving portion of the second member, and may be progressively received in additional grooves on the retaining formation if the first member is further inserted into the second member.

9 Claims, 15 Drawing Sheets

U.S. PATENT DOCUMENTS

| | | | |
|---|---|---|---|
| 5,026,200 A * | 6/1991 | van Bilderbeek | 285/321 |
| 5,086,839 A * | 2/1992 | Setterberg et al. | 166/138 |
| 5,378,100 A * | 1/1995 | Fullerton | 411/267 |
| 5,427,488 A * | 6/1995 | Fullerton et al. | 411/433 |
| 5,613,816 A * | 3/1997 | Cabahug | 411/433 |
| 5,800,108 A * | 9/1998 | Cabahug | 411/433 |
| 5,934,709 A * | 8/1999 | Morrison | 285/39 |
| 6,293,343 B1 * | 9/2001 | Pallini et al. | 285/315 |
| 6,682,107 B2 * | 1/2004 | Munk et al. | 285/307 |

FOREIGN PATENT DOCUMENTS

| | | |
|---|---|---|
| GB | 2 217 417 A | 10/1989 |

OTHER PUBLICATIONS

Derwent English Abstract for DE 195 17 269 A1.

* cited by examiner

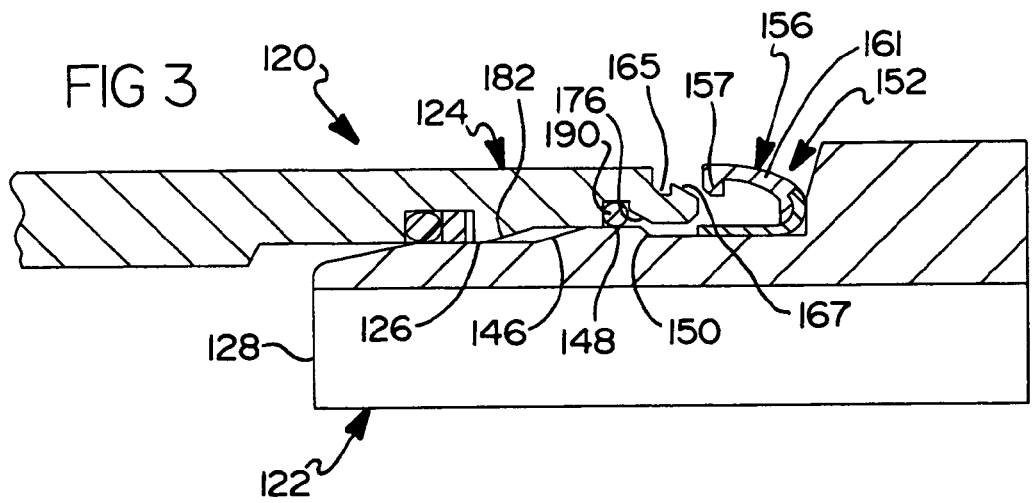
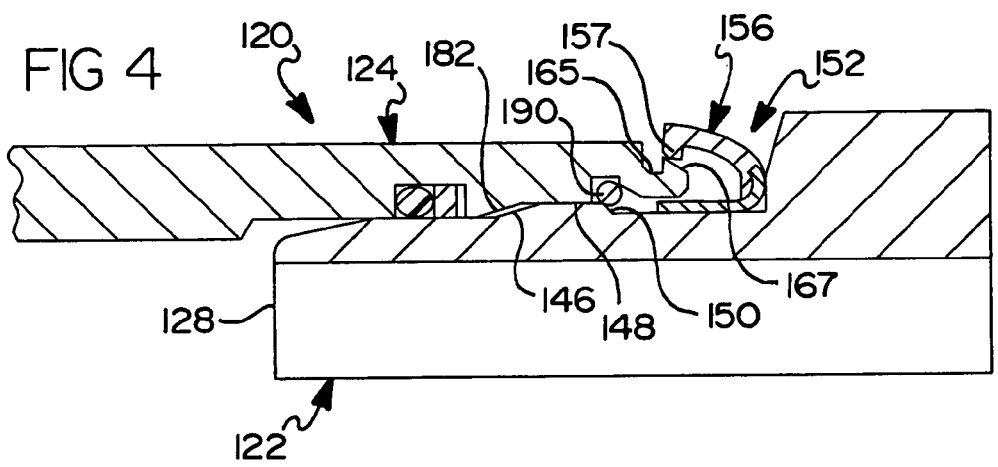
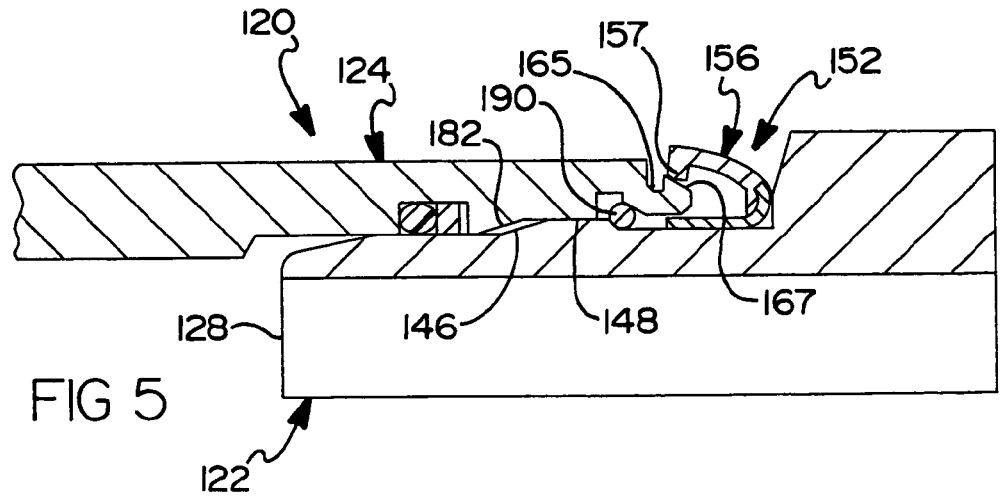

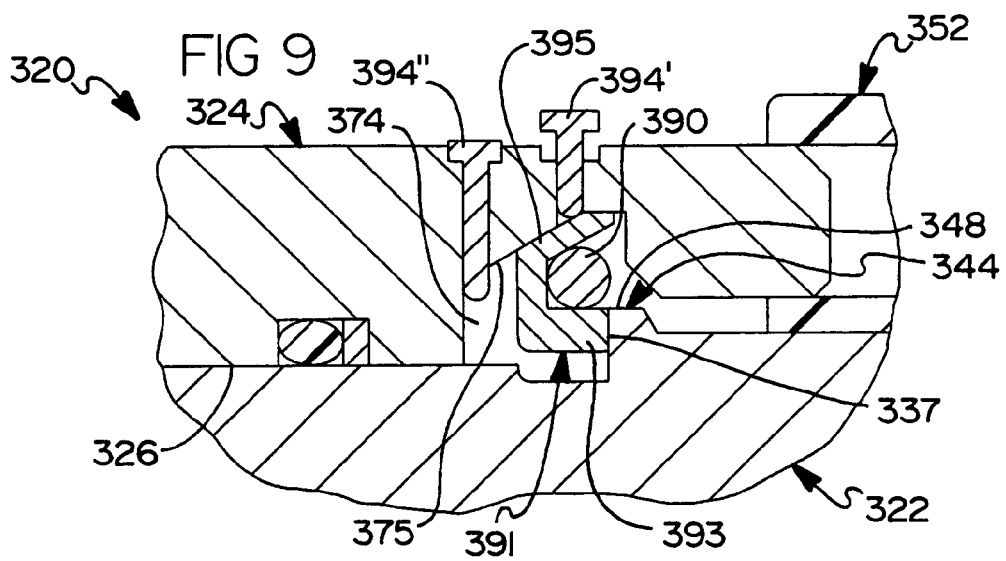
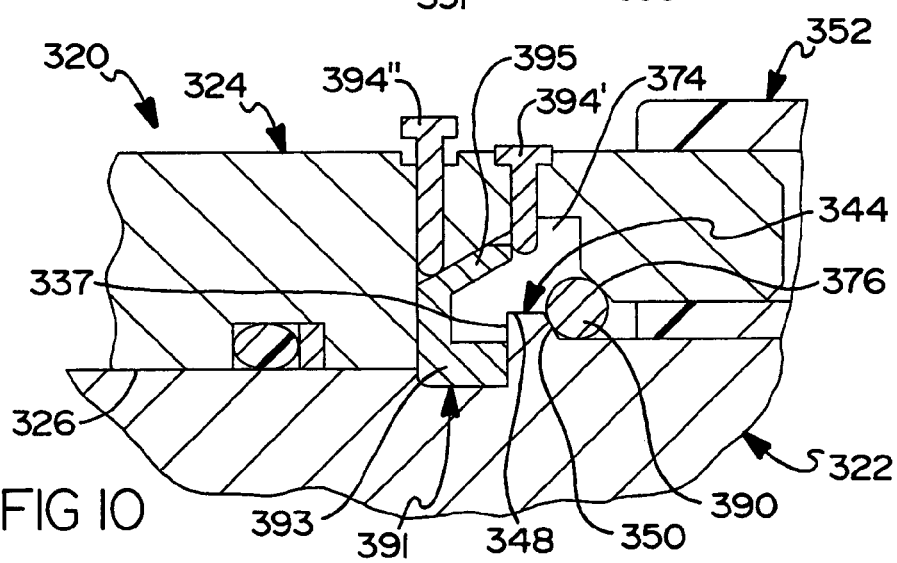
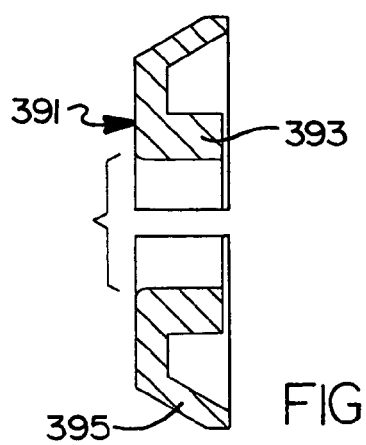

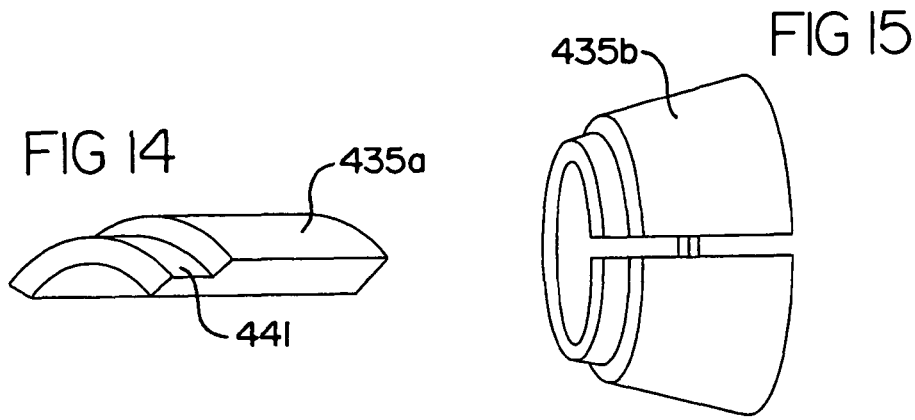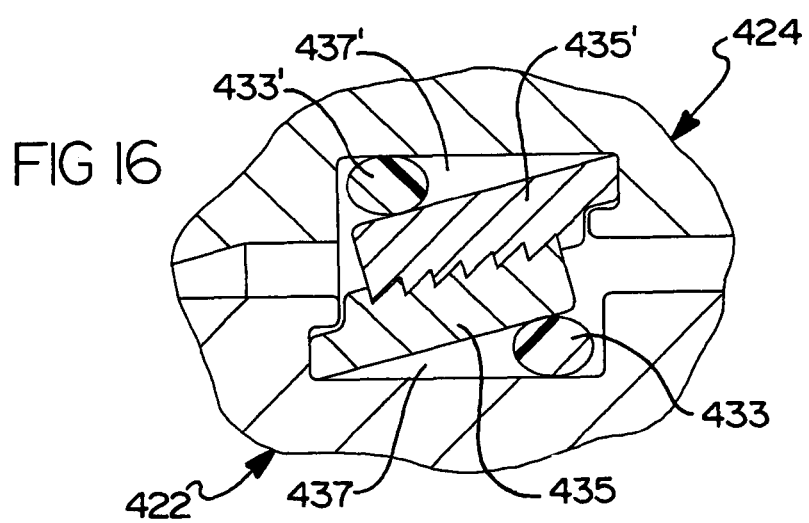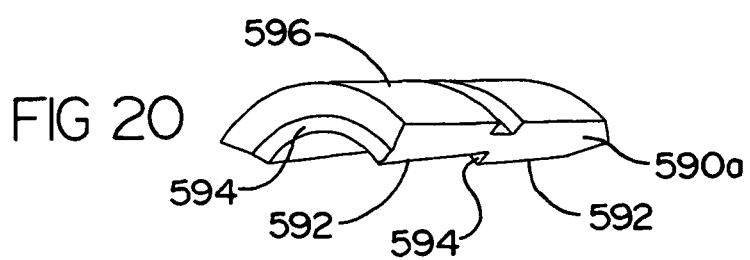

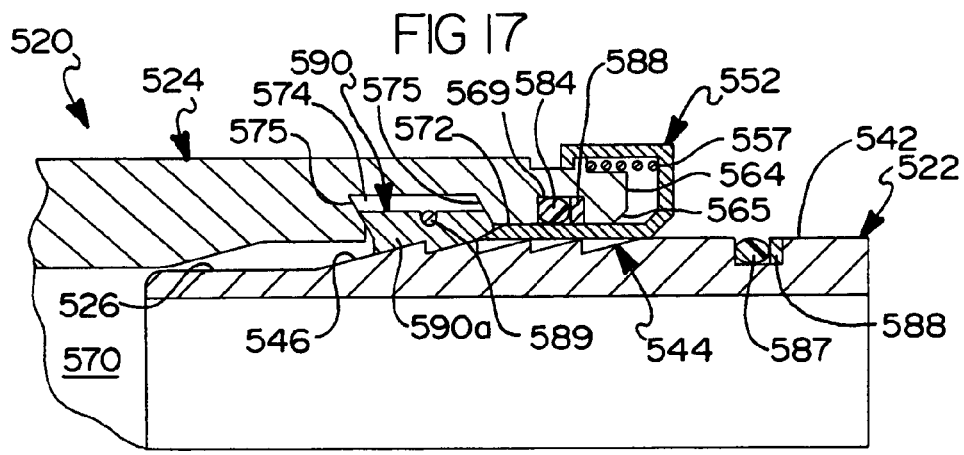
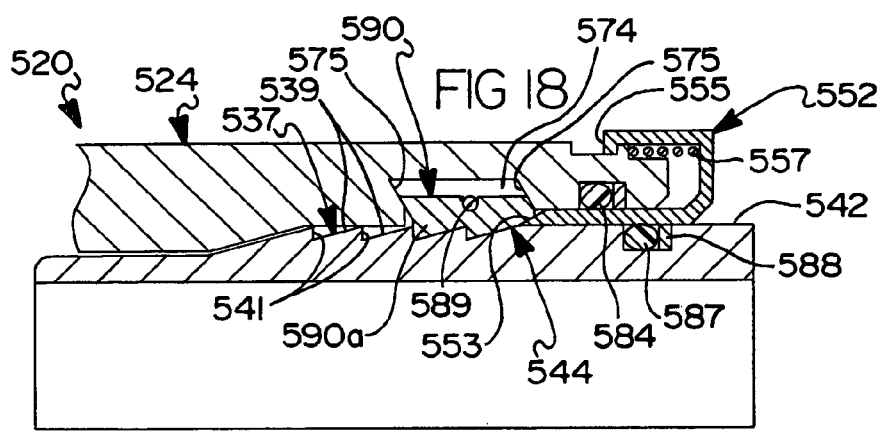
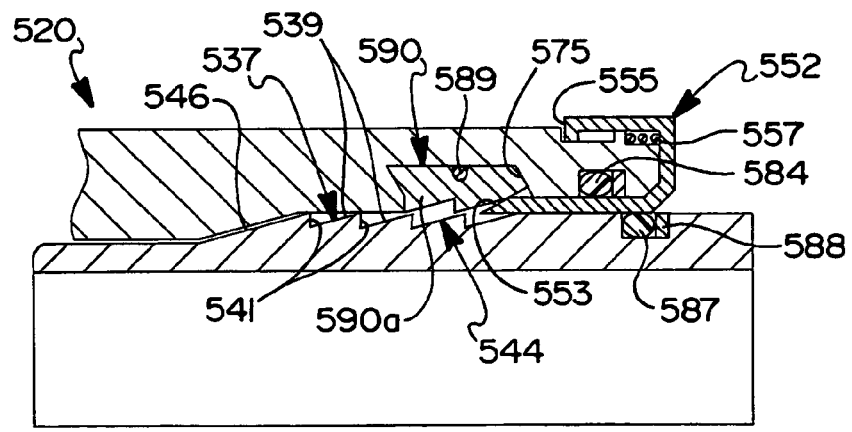

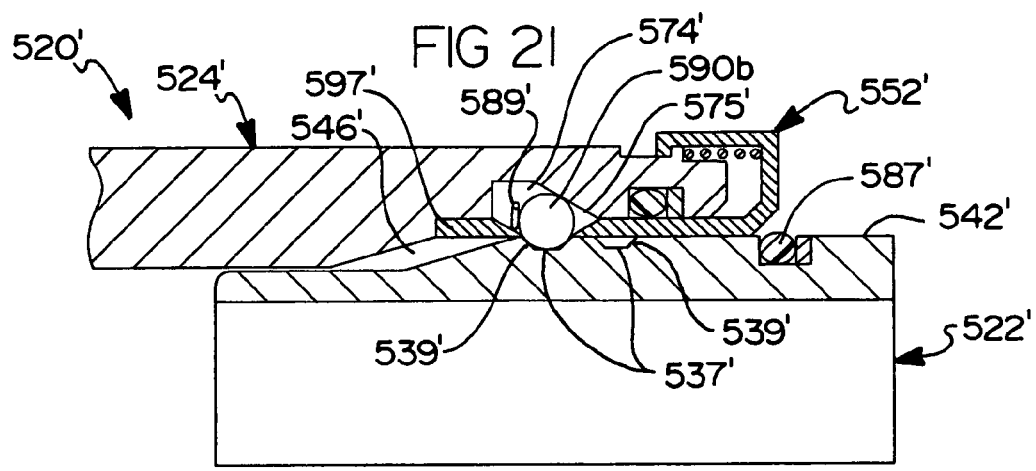
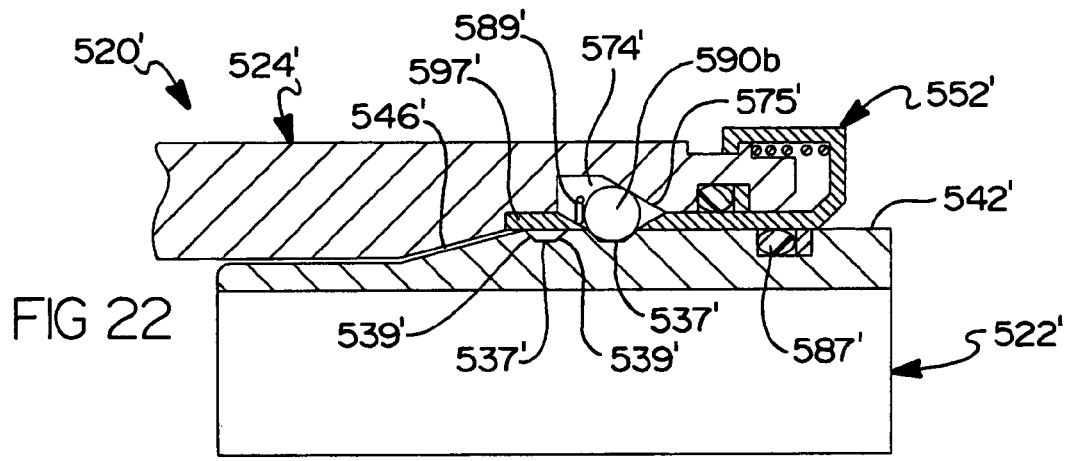
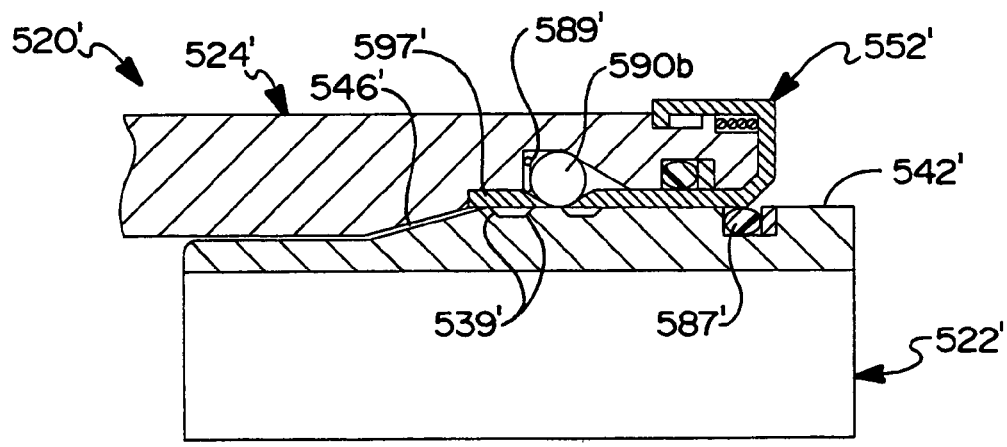

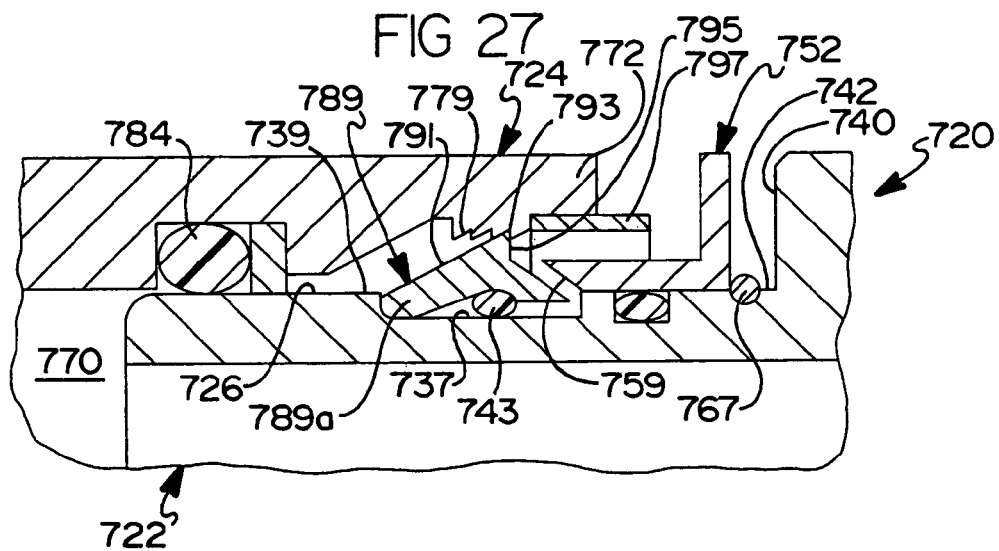
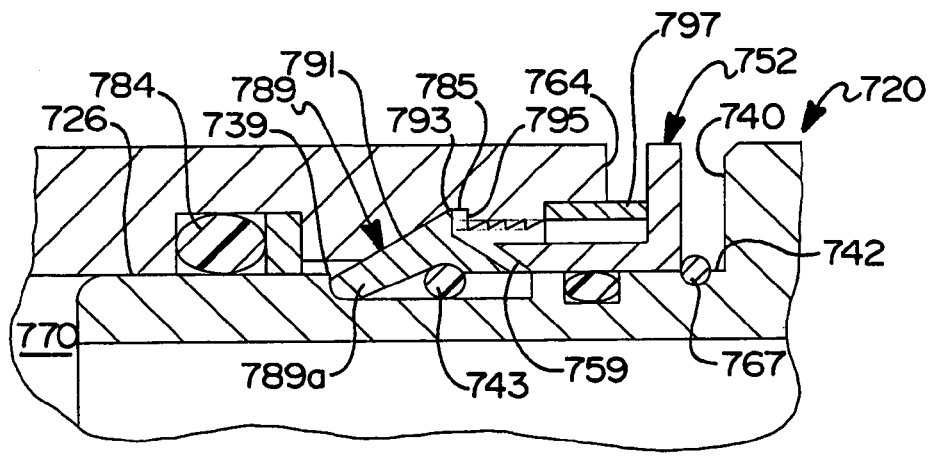
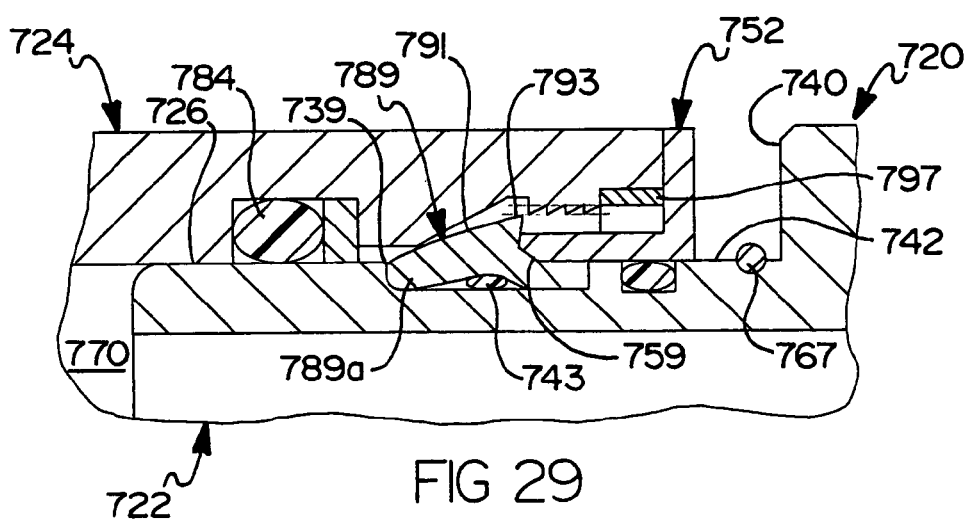

COUPLING ASSEMBLY

CROSS REFERENCE TO RELATED APPLICATIONS

This application claims priority to U.S. provisional application No. 60/388,869 filed on Jun. 14, 2002, which is incorporated herein by reference in its entirety.

BACKGROUND OF THE INVENTION

1. Field of the Invention

The present invention relates generally to coupling assemblies having push-to-connect style coupling members and more particularly to a releasable coupling assembly including mechanisms for verifying connection of the coupling members.

2. Description of the Related Art

There are many industrial applications where a relatively high pressure hydraulic system requires that several connections be made between a hose and a component such as a pump, motor, valve and the like. Prior art hydraulic systems have historically used threaded fittings to make this connection.

Recently, push-to-connect style coupling assemblies have become available. One type of push-to-connect coupling assembly utilizes an annular locking ring to secure a male coupling member to a female coupling member. The annular locking ring engages an outwardly extending rib on the male member, which generally includes a tapered ramp and shoulder. The male coupling member may also include a release sleeve moveably disposed thereon for expanding the locking ring and releasing the male member from the female member.

A known limitation of the above-described coupling assembly is that it functions as a go/no-go type connection. Stated differently, the male coupling member is either sealingly "connected" to the female coupling member, or it is "disconnected." Known push-to-connect style coupling assemblies lack the ability to be partially connected, whereby the male coupling member is non-sealingly secured to the female coupling member. Because push-to-connect style coupling assemblies may be employed in systems that operate at relatively high pressures, a "disconnected" coupling assembly that is thought to be "connected" will blow-apart once pressurized, leaving an empty port to pour fluid from.

Unfortunately, in known push-to-connect style coupling assemblies, it is difficult to ascertain whether the male member is sealingly connected to the female member. Generally, there is a very small difference in axial position of the male member between the "connected" and "disconnected" states. Furthermore, visual verification of the state of connection is usually impaired due to the position of the locking ring being well within the interior of the female member. For these and other reasons, it is desirable to provide an improved coupling assembly and approach for conveniently verifying connection of the coupling members.

SUMMARY OF THE INVENTION

A coupling assembly is disclosed that includes a first member and a second member having a receiving portion sized to receive the first member. A retaining formation is provided on one of the first and second members. The retaining formation includes a ramp and two or more grooves, wherein each groove is at least partially defined by converging surfaces. A locking member is moveably secured in a cavity in the other of the first and second members. The locking member is configured to be moved in a first radial direction by the ramp upon movement of the first member into the second member. The locking member is also biased in a second radial direction opposite the first radial direction into a groove in the retaining formation to become positioned between a converging surface on the retaining formation and the cavity upon further movement of the first member into the receiving portion of the second member, and may be progressively received in additional grooves on the retaining formation if the first member is further inserted into the second member. Among other things, this progressive connecting feature provides a tactile indication that the first and second members are connected.

BRIEF DESCRIPTION OF THE DRAWINGS

Embodiments of the invention will now be described, by way of example, with reference to the accompanying drawings, wherein:

FIGS. 3-7 are cross-sectional views of a coupling assembly according to an embodiment of the invention, showing the various stages of connection;

FIGS. 9 and 10 are cross-sectional views of a coupling assembly according to another embodiment of the present invention, showing two stages of connection;

FIG. 11 is a cross-sectional view of an expander for use in the coupling assembly of FIGS. 9 and 10;

FIG. 14 is a perspective view of a locking member segment for use in the coupling assembly of FIGS. 12 and 13;

FIG. 15 is a perspective view of a locking member for use in the coupling assembly of FIGS. 12 and 13;

FIG. 16 is a detail view of the coupling assembly of FIGS. 12 and 13, showing another embodiment of the locking member segments;

FIGS. 17-19 are cross-sectional views of a coupling assembly according to another embodiment of the present invention, showing various stages of connection;

FIG. 20 is a perspective view of a locking member segment for use in the coupling assembly of FIGS. 17-19;

FIGS. 21-23 are cross-sectional views of a coupling assembly according to another embodiment of the present invention, showing various stages of connection;

FIGS. 27-29 are cross-sectional views of a coupling assembly according to another embodiment of the present invention, showing various stages of connection;

DETAILED DESCRIPTION

Figure 1:
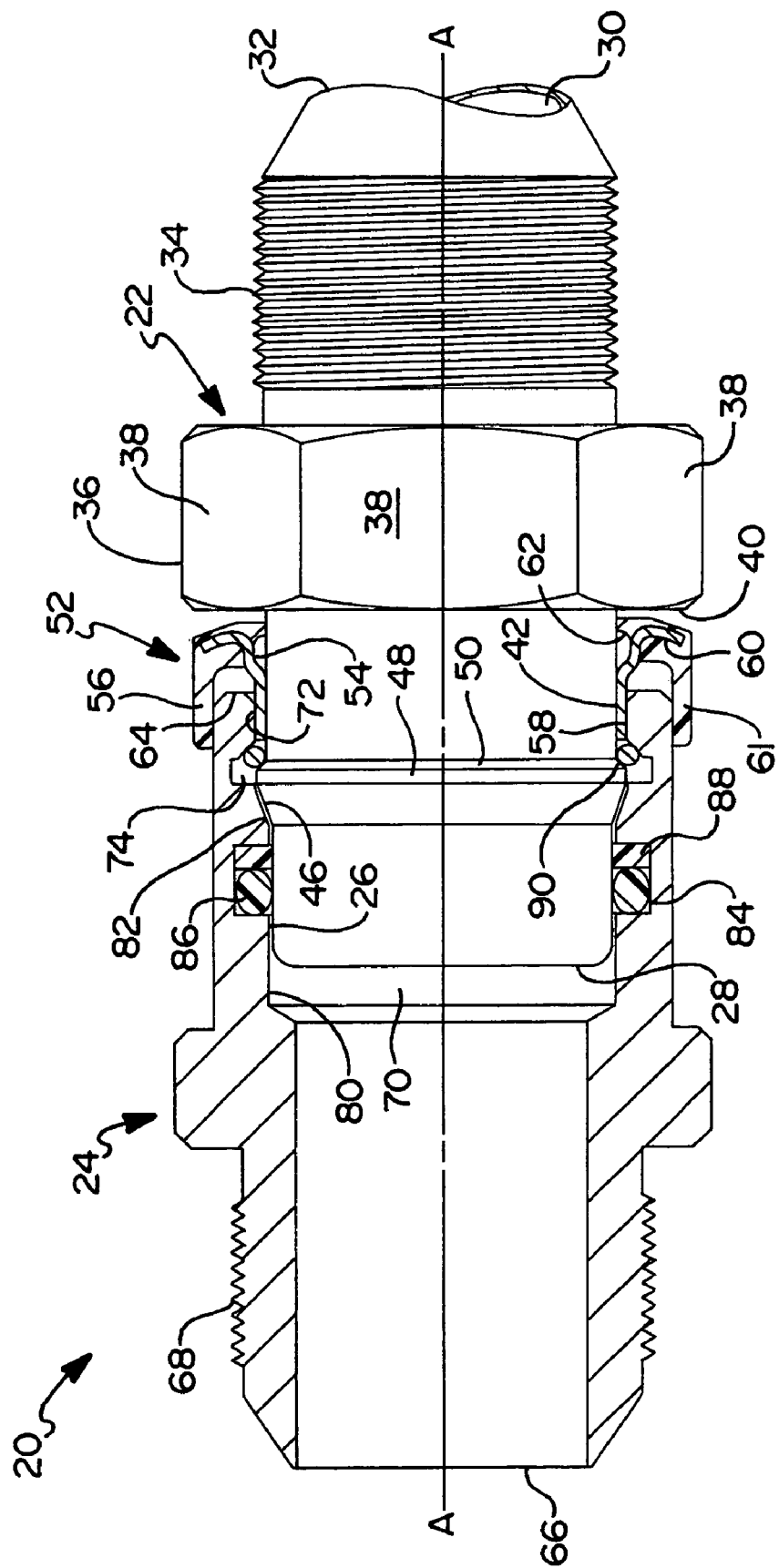
FIGS. 1 and 2 are partial cross-sectional views of an exemplary prior art push-to-connect style coupling assembly.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 2:
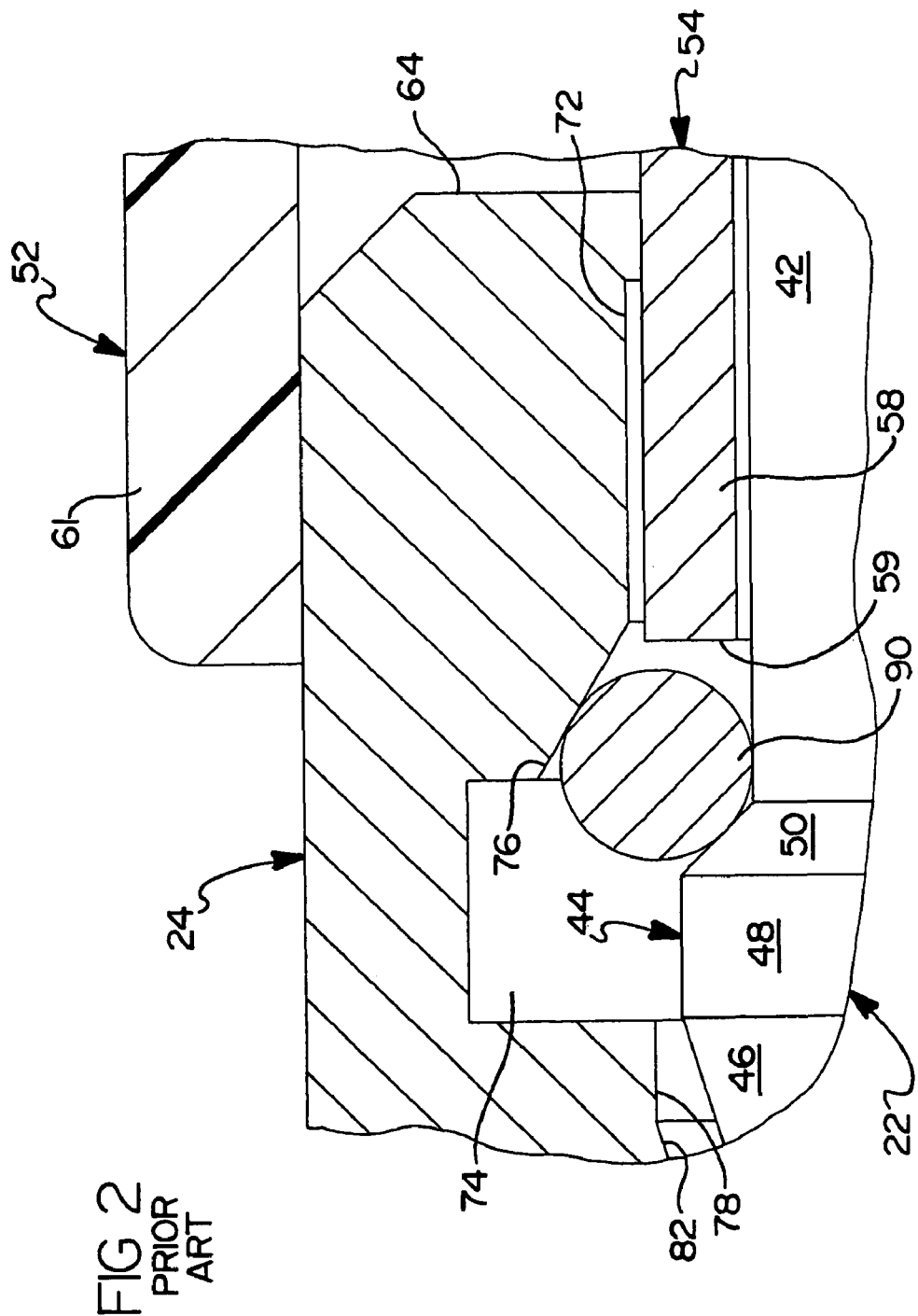

Referring to FIGS. 1 and 2, a partial cross-sectional view of an exemplary prior art coupling assembly 20 is shown. Embodiments of the types of coupling assembly 20 illustrated in FIGS. 1 and 2 are disclosed in U.S. Pat. Nos. 5,226,682 and 5,553,895, which are incorporated herein by reference in their entirety. Coupling assembly 20 includes a first member 22 and a second member 24. First member 22, which functions as the "male" member of coupling assembly 20, includes a first exterior surface 26 adjacent a leading end 28 for insertion into second member 24. First member 22 further includes a passageway 30 extending therethrough from leading end 28 to a trailing end 32. If desired, trailing end 32 may be provided with external threads 34 or other suitable connecting feature, such as a barbed surface, for fastening to a separate member (none shown), such as a hose fitting, adapter and the like.

In the illustrated embodiment, first member 22 includes a collar 36 extending radially outward from first member 22. Collar 36 may include flats 38 for engagement by a wrench if trailing end 32 is provided with external threads. Collar 36 includes a support surface 40 that extends substantially perpendicular to flats 38.

Referring to FIG. 2, a detailed view of the connecting interface of coupling assembly 20 is shown. In the illustrated embodiment, first member 22 includes a second exterior surface 42, which is separated from first exterior surface 26 (FIG. 1) by a retaining formation or "rib" 44. In a particular embodiment, rib 44 includes a ramp 46 tapering outwardly from first exterior surface 26 in a direction away from leading end 28 at an angle relative to axis A-A in the range of approximately 10 degrees to 25 degrees. Ramp 46 extends to a cylindrical surface 48 that is substantially parallel to second exterior surface 42. Surface 48 extends rearwardly (to the right in FIG. 2) away from ramp 46 a distance of at least 0.010 inches until it meets a substantially linear or slightly rounded shoulder 50 that tapers inwardly to second exterior surface 42. Shoulder 50 tapers an angle in the range of about 35 degrees to 55 degrees relative to axis A-A. Alternatively, ramp 46 may extend outwardly from first exterior surface 26 to a "point" (see, e.g., U.S. Pat. No. 5,226,682) where it meets shoulder 50.

A release sleeve 52 is moveably disposed on second exterior surface 42 of first member 22. Release sleeve 52 includes a rigid release portion 54 and a flexible sealing portion 56. In the illustrated embodiment, rigid release portion 54 includes a cylindrical wall portion 58 that extends from a leading edge 59 to a radially outwardly extending wall portion 60. Sealing portion 56 is formed of a polymeric material, such as an elastomeric and/or thermoplastic polymer, having a generally cylindrical wall portion 61 and an annular fin 62 located radially inward of outwardly extending wall portion 60. Fin 62 sealingly engages second exterior surface 42 and/or support surface 40 of first member 22 to inhibit or at least minimize the ingression of dust and other debris into coupling assembly 20 while first member 22 and second member 24 are connected.

Optionally, release sleeve 52 may be slidably secured to first member 22 by annularly reducing or "crimping" wall portion 58 around second exterior surface 42. Alternatively, rigid release portion 54 may be non-continuous, having a split from leading edge 60 through wall portion 58 to allow rigid release portion 54 to expand over rib 44 during assembly onto first member 22. When it is desired to axially move release sleeve 52 on first member 22, a tool may be used for additional leverage between release sleeve 52 and support surface 40.

Referring again to FIG. 1, second member 24 generally functions as the "female" member of coupling assembly 20 and is designed to receive first member 22. In a particular embodiment, second member 24 extends from a receiving end 64 to a remote end 66, which may have adjacent thereto external threads 68 or other suitable connecting feature. Second member 24 includes a receiving portion 70 that extends from receiving end 64 and an inner cylindrical surface 72 having a first inwardly facing annular groove 74 extending radially outwardly therefrom. A chamfer 76 (FIG. 2) extends inwardly from first annular groove 74 toward receiving end 64 until it meets first interior cylindrical surface 72. The angle between chamfer 76 and cylindrical surface 72 is in the range of approximately 20 degrees to 40 degrees. Alternatively, a second annular groove (see, e.g., U.S. Pat. No. 5,570,910), having a slightly smaller diameter than first annular groove 74, may be provided adjacent first annular groove 74 in place of chamfer 76 in couplings that operate in relatively high pressure hydraulic systems.

In the illustrated coupling assembly 20, second member 24 includes a second interior cylindrical surface 78 that is joined to first annular groove 74. A third interior cylindrical surface 80 may also be provided in second member 24 that is slightly larger than the outside diameter of first exterior surface 26 on first member 22 to allow first member 22 to be received within receiving portion 70. Third interior cylindrical surface 80 is separated from second interior cylindrical surface 78 by a tapered wall 82. Third interior cylindrical surface 80 preferably has formed therein a second inwardly facing annular groove 84 in which is positioned an annular sealing element 86, such as an o-ring, and a support ring 88 that serves to protect annular sealing element 86 from damage when installed in hydraulic systems having high impulse flow of fluid.

Positioned in first annular groove 74 is an annular locking member 90 formed of a metal, such as a phosphoric bronze material or stainless steel. The metal of locking member 90 may be spring tempered so that locking member 90 has flexibility to expand and return to its original shape. In a particular embodiment, locking member 90 is not continuous, but includes two ends that are in abutting relationship or slightly spaced apart (e.g., about 0.030 inch) to allow locking member 90 to expand and contract without significantly altering its annular shape. While first member 22 is disconnected from second member 24, locking member 90 has an external diameter less than the inside diameter of first annular groove 74, but larger than the diameter of first internal cylindrical surface 72. Additionally, locking member 90 has an internal diameter substantially equal to or, preferably slightly smaller than that of second exterior surface 42 on first member 22, allowing locking member 90 to tightly engage first member 22 when connected to second member 24.

As first member 22 is inserted into second member 24, leading end 28 and first exterior surface 26 pass through the inside diameter of locking member 90 until ramp 46 reaches locking member 90. Upon further insertion, locking member 90 is forced to travel up ramp 46, thereby expanding locking member 90 until it reaches surface 48. As surface 48 moves past locking member 90, the resilience of the metal acts to contract locking member 90 behind shoulder 50, as shown in FIGS. 1 and 2. As detailed in FIG. 2, locking member 90 will prevent withdrawal of first member 22 from second member 24 by virtue of locking member 90 being trapped between shoulder 50 and chamfer 76. Shoulder 50 and chamfer 76 are disposed at converging angles in the direction toward annular groove 74 when first member 22 is connected to second member 24. This convergence results from the angle of shoulder 50 being greater than the angle of chamfer 76 in relation to axis A-A. While this design provides a robust connection, it is sometimes difficult to determine if locking member 90 has achieved the desired position between shoulder 50 and chamfer 76.

The embodiments of the present invention disclosed herein provide a connecting interface for a push-to-connect style coupling assembly that allows a user to visually and/or tactically verify connection of the coupling members. For illustration purposes, the various embodiments disclosed herein will be shown and described in coupling members substantially similar to first 22 and second 24 members shown in FIGS. 1 and 2, unless otherwise indicated, but may be used in other push-to-connect style coupling assemblies without departing from the spirit and scope of the present invention.

Referring to FIGS. 3-7, a coupling assembly 120 according to an embodiment of the invention is shown. Coupling assembly 120 is substantially similar to coupling assembly 20 described above with at least one exception, namely, the configuration of release sleeve 152 and the release sleeve's interaction with second member 124. In a particular configuration, flexible sealing portion 156 includes at least one annular bead 157 that extends radially inward from wall portion 161. Receiving end 164 of second member 124 includes a recess 165 sized to receive bead 157 when first 122 and second 124 members are connected. A chamfer 167 extends from receiving end 164 forward (to the left in FIGS. 3-7) to recess 165, and provides a ramp for deflecting wall portion 161 radially outward as release sleeve 152 moves toward second member 124.

Referring to FIG. 3, as first member 122 is inserted into second member 24, leading end 128 and first exterior surface 126 pass through the inside diameter of locking member 190 until ramp 146 reaches locking member 190. Upon further insertion, locking member 190 is forced to travel up ramp 146, thereby expanding locking member 190. At this point, if first member 122 is moved further into second member 24 (slightly to the left in FIG. 4), locking member 190 will contract behind shoulder 150 and connect first and second members 122, 124 together, as shown in FIG. 5. However, if first member 122 moves slightly to the right, the members will not be connected. FIGS. 3-5 illustrate the fine line between the "connected" and "disconnected" states.

Although FIG. 5 shows first and second members 122, 124 being connected, the connection has not been "verified" by receipt of bead 157 into recess 165. The distance between tapered wall portion 182 and ramp 146 is such that first member 122 may be pushed axially inward a predetermined distance (to the left in FIG. 5) until ramp 146 contacts wall portion 182 or "bottoms-out" (see, e.g., FIG. 6). For bead 157 to be received in recess 165, first member 122 must be "bottomed-out" within second member 124, causing support surface 140 to engage and push release sleeve 152 and, more particularly, bead 157 into recess 165. Thus, "bottoming-out" first member 122 within second member 124 ensures coupling assembly 120 is connected. The connection is verified by visual examination of bead 157 received in recess 165. Although coupling assembly 120 can be "connected," but not verified, if properly used, coupling assembly 120 cannot be verified as being connected and not actually "connected."

Figure 6:
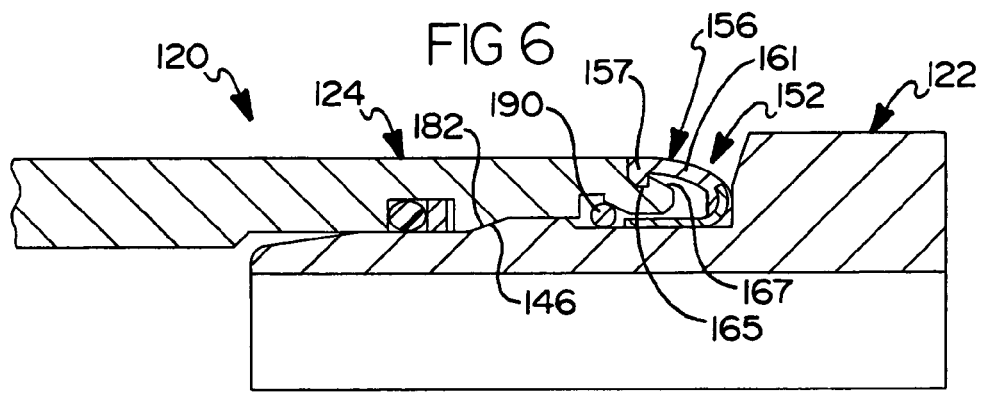

FIG. 6 shows bead 157 received into recess 165 creating a dust seal and verifying connection of the first 122 and second 124 members. The distance between locking member 190 and shoulder 150 in FIG. 6 illustrates the amount of over-travel between first member 122 and second member 124. When a pressurized fluid is introduced within coupling assembly 120, first member 122 is forced in a direction away from second member 124 creating a gap (X) between release sleeve 152 and support surface 140 (see, e.g., FIG. 7). The presence of gap (X) further verifies the connection of first member 122 to second member 124.

Figure 7:
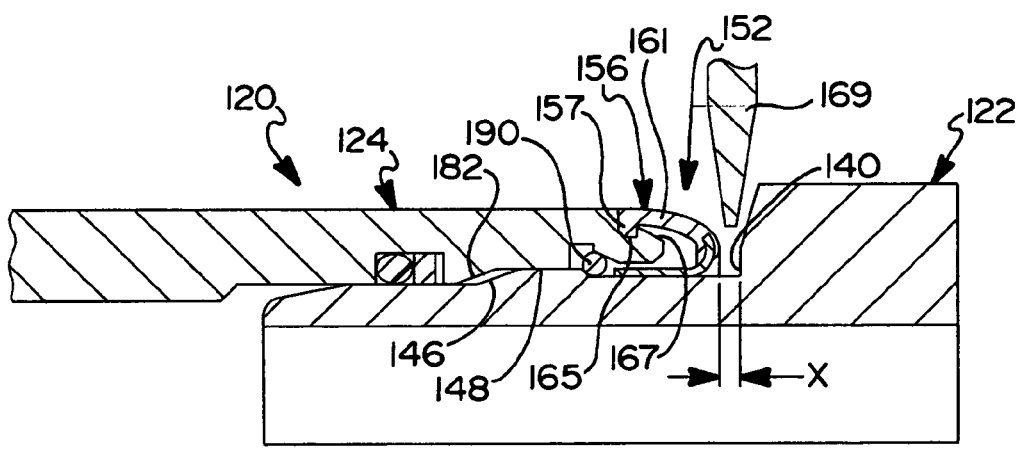

Referring to FIG. 7, during connection, bead 157 remains in recess 165 as first member 122 moves axially within second member 124. When it is desired to disconnect first member 122 from second member 124, release sleeve 152 is moved in a direction toward second member 124 (to the left in FIG. 7). A tool 169 may be used for additional leverage between support surface 140 and release sleeve 152. The gap (X) present between support surface 140 and release sleeve 152 permits tool 169 to be inserted therebetween. The gap (X) also makes the tool insertion location more obvious to the user and requires less travel of release sleeve 152 and compression of flexible sealing portion 156 against second member 124 during disconnection of the coupling assembly.

Figure 8:
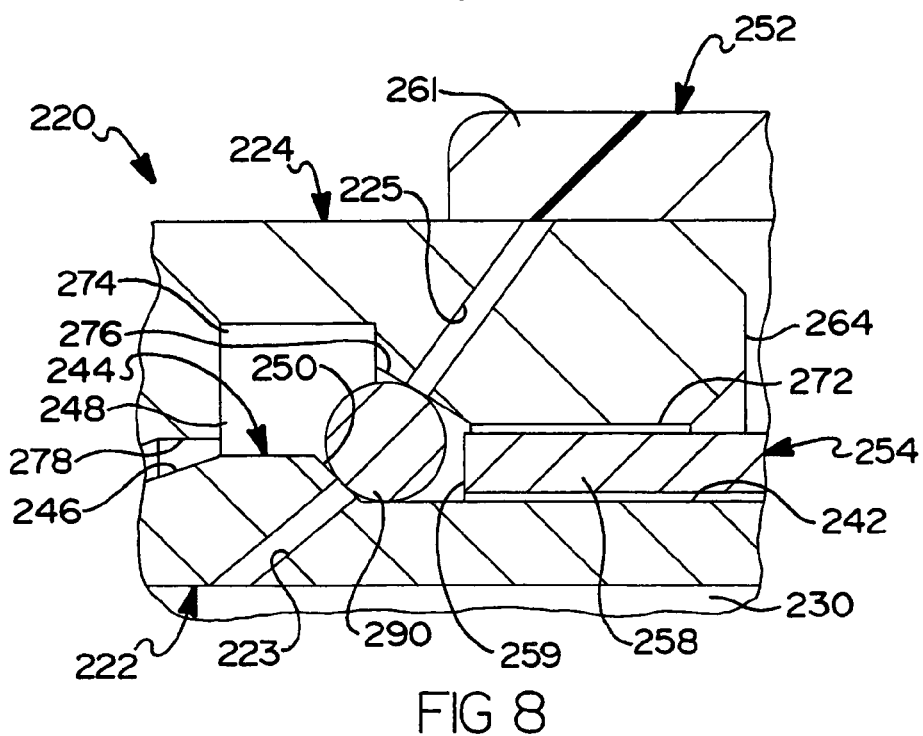
FIG. 8 is a cross-sectional view of a coupling assembly according to another embodiment of the invention.
Figure 12:
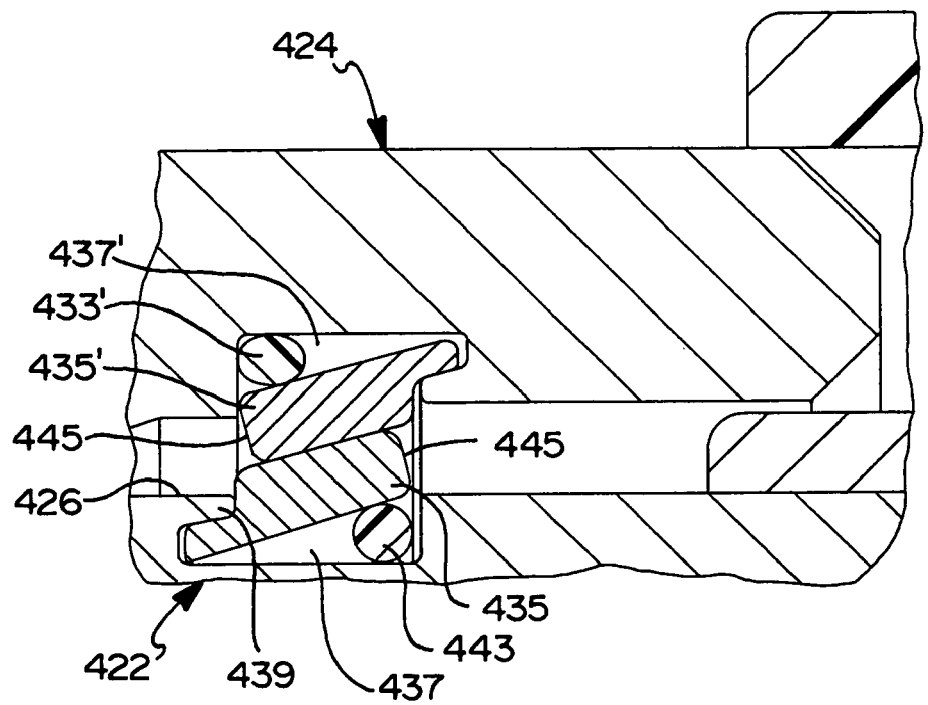
FIGS. 12 and 13 are cross-sectional views of a coupling assembly according to another embodiment of the present invention, showing two stages of connection.
Figure 13:
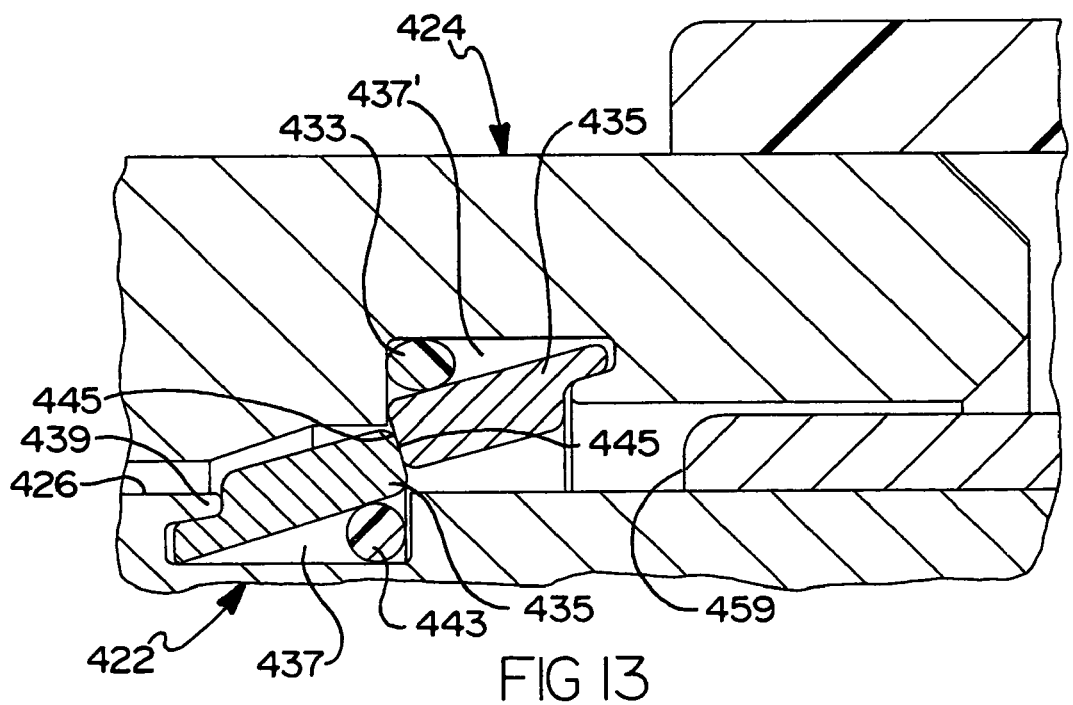

Referring to FIG. 8, another embodiment of the present invention is shown. In this embodiment, a coupling assembly 220 is provided that includes a first member 222 and a second member 224. First member 222 is substantially similar to first member 22 described above with at least one exception, namely, at least one duct 223 extends between shoulder 250 and passageway 230. When first member 222 is connected to second member 224, and locking member 290 is positioned behind shoulder 250, locking member 290 covers the opening to duct 223 and prevents fluid flow from duct 223. However, if first member 222 is not connected to second member 224 and locking member 290 is not properly positioned behind shoulder 250, pressurized fluid will be permitted to flow through duct 223 and work its way past release sleeve 252.

Connection of coupling assembly 220 can be verified by operating the hydraulic system within which coupling assembly 220 is installed at a relatively low fluid pressure. Fluid leakage between release sleeve 252 and second member 224 and/or first member 222 provides a visual indication that first member 222 is not connected to second member 224.

Referring still to FIG. 8, second member 224, which in the illustrated embodiment is substantially similar to second member 22 described above, may optionally include at least one duct 225 that extends from chamfer 276 to an outer surface of second member 224. If locking member 290 is not properly positioned between shoulder 250 and chamfer 276, fluid will be permitted to flow through ducts 223 and 225 and work its way past release sleeve 252 to provide a visual indication that first member 222 is not connected to second member 224.

Optionally, an external surface of locking member 290 may be coated with a sealing material, such as rubber or plastic. The optional coating would improve the seal between locking member 290 and chamfer 276 and/or shoulder 250, particularly in applications where coupling assembly contains a relatively high pressure fluid.

Referring to FIGS. 9-11, another embodiment of the present invention is shown. In this embodiment, a coupling assembly 320 is provided that includes a first member 322 and a second member 324. Second member 324 is substantially similar to second member 24 described above with at least one exception, namely, a resilient expander 391 is received in first annular groove 374 to expand locking member 390.

In a particular embodiment, expander 391 is made from a resilient material, such as plastic or spring steel. PTFE is an exemplary material given its resilient characteristics and low coefficient of friction. Structurally, expander 391 includes an inner hub 393 and a radially outwardly extending flange 395. Flange 395 is tapered for sliding engagement with a corresponding tapered surface 375 in first annular groove 374. In the illustrated embodiment, expander 391 also includes a split between two ends (FIG. 11) to allow expander 391 to sufficiently contract for insertion into second member 324 during assembly.

Prior to insertion of first member 322 into second member 324, locking member 390 is positioned over hub 393. The expansion force provided by expander 391 is generally greater than the contracting spring force of locking member 390 to force locking member 390 into an expanded state (see, e.g., FIG. 9). Because locking member 390 is expanded prior to insertion of first member 322 into second member 324, first member 322 is not required to expand locking member 390 as required in coupling assembly 20 described above.

First member 322 is substantially similar to first member 22 described above with at least one exception, namely, rib 344 does not include a ramp extending outwardly from first exterior surface 326. Instead, rib 344 includes a forward shoulder 337 that is substantially perpendicular to first exterior surface 326. Optionally, first exterior surface 326 may include a recess adjacent forward shoulder 337 and sized to receive hub 393 as expander 391 is contracted therein.

As first member 322 is inserted into second member 324, shoulder 337 engages hub 393 and forces it axially forward (to the left in FIG. 9) within first annular groove 374. Engagement of tapered flange 395 with tapered surface 375 causes expander 391 to contract as first member 322 pushes expander 391 axially forward in groove 374. As first member 322 travels further into second member 324, locking member 390 slides off of hub 393 onto surface 348 of rib 344. If first member 322 is not inserted further into second member 324, expander 391 will expand and eject first member 322 from second member 324. However, once first member 322 is moved to the "connected" position (see, e.g., FIG. 10), locking member 390 contracts between trailing shoulder 350 and chamfer 376 to secure first member 322 within second member 324.

Optionally, second member 324 may include at least one connection indicating member 394 to visually verify when first member 322 is connected to second member 324. In a particular embodiment, second member 324 includes a pair of cylindrical indicating members 394 that extend through second member 324 into groove 374. Prior to insertion of first member 322 into second member 324, a first indicating member 394' is engaged by expander 391 and forced to protrude beyond an outer surface of second member 324 to indicate second member 324 is "ready for assembly." When first member 322 is connected to second member 324, a second indicating member 394" is engaged by the contracted expander 391 and forced to protrude beyond the outer surface of second member 324 to indicate a positive connection. Indicating members 394 may be made of a material that changes color in the presence of a fluid, such as oil, to indicate leakage between first and second members 322, 324. Excessive wear in the mating parts, particularly locking member 390, will cause first member 322 to move axially out of second member 324 (to the right in FIGS. 9 and 10), allowing second indicating member 394" to retract into second member 324 and provide a visual indication of wear.

Referring to FIGS. 12-16, another embodiment of the present invention is shown. In this embodiment, a coupling assembly 420 is provided that includes a first member 422 and a second member 424. First member 422 is substantially similar to first member 22 described above with at least one exception, namely, first member 422 includes a moveable locking member 435 instead of rib 44. In an embodiment, locking member 435 is received within a cavity 437 that extends radially inward from first exterior surface 426. A lip 439 extends axially into a portion of cavity 437 to retain locking member 435 within cavity 437.

In a particular configuration, locking member 435 includes a number of individual locking member segments 435a disposed in cavity 437 around first member 422. As shown in FIG. 14, each locking member segment 435a is slightly curved and includes a shoulder 441 that is insertable under lip 439 to retain locking member segments 435a in cavity 437. A resiliently compressible member 443, such as, for example, an o-ring (shown in FIGS. 12 and 13) or a garter spring, is disposed between locking member segments 435a and the inner circumferential surface of cavity 437. Resiliently compressible member 443 allows locking member segments 435a to pivot into cavity 437 during insertion of first member 422 into second member 424, and biases locking member segments 435a radially outward once first member 422 is connected to second member 424.

Alternatively, as illustrated in the embodiment shown in FIG. 15, locking member 435 may function as a split locking ring 435b having a gap between two ends that allows locking member 435b to contract. In this embodiment, locking member 435b is made of a resiliently compressible material, such as spring steel, which allows locking member 435 to contract as first member 422 is inserted into second member 424, and then expand after first member 422 is connected to second member 424. Locking member 435b does not require a separate resiliently compressible member 443 between locking member 435 and the inner circumferential surface of cavity 437.

Referring again to FIGS. 12 and 13, second member 424 also includes a cavity 437', a locking member 435' and a resiliently compressible member 443'. As first member 422 is inserted into second member 424, locking members 435, 435' engage one another and pivot into their respective cavity 437, 437' against the biasing force of resiliently compressible members 443, 443' or the spring force of locking member 435 itself (e.g., 435b). As first member 422 is inserted further into second member 424, locking member 435 in first member 422 clears the corresponding locking member 435' in second member 424, allows locking member 435, 435' to pivot radially outward from their respective cavity 437, 437'. In this position, engagement ends 445 of locking members 435 abut one another and prevent first member 422 from being removed from second member 424. This embodiment requires a relatively low axial force to push first member 422 into second member 424, particularly when compared to the prior art coupling shown above in FIGS. 1 and 2. Additionally, this design provides an improved tactile indication that the two members are connected due to the cooperative movement of locking members 435, 435'. In other words, a user connecting first and second members 422, 424 is able to feel locking members 435, 435' "snap" behind each other as one locking member cams over the other.

Optionally, as shown in FIG. 16, an outer surface of locking members 435, 435' may be serrated to provide for progressive connecting of first and second members 422, 424. This feature prevents first member 422 from "blowing-out" of second member 424 under pressure when first and second members 422, 424 are not fully connected (see, e.g., FIG. 12), and provides a tactile indication that first and second members are in the process of being connected.

Referring again to FIG. 13, when it is desired to disconnect first member 422 from second member 424, release sleeve 452 is moved in a direction toward second member 424. As noted above, a tool may be used for additional leverage between support surface 440 and release sleeve 452. The leading edge 459 of release sleeve 452 engages the outer surface of the locking member 435' in second member 424, forcing locking member 435' to pivot into cavity 437'. Once pivoted a sufficient distance into cavity 437', locking member 435 is free to pass by locking member 435' in second member 424.

Referring to FIGS. 17-20, another embodiment of the present invention is shown. In this embodiment, a coupling assembly 520 is provided that includes a first member 522 and a second member 524. Second member 524, includes a receiving portion 570 that extends from a receiving end 564. A first chamfer 565 extends inwardly from receiving end 564 to a first interior cylindrical surface 572. Cylindrical surface 572 includes a first inwardly facing annular groove 569 having at least one annular sealing member 584, such as an o-ring, and an optional support ring 588 received therein. Cylindrical surface 572 also includes a second inwardly facing annular groove 574 extending radially outwardly therefrom. Groove 574 includes spaced apart first and second tapered surfaces 575, which extend outward from cylindrical surface 572 and away from receiving end 564.

A locking member 590 is moveably received in groove 574. In a particular embodiment, locking member 590 includes individual locking member segments 590a moveably disposed in groove 574. Each locking member segment 590a includes at least one inwardly facing tooth defined by a tapered ramp 592 and a shoulder 594. Locking segments 590a are biased radially inward by a resilient member 589, such as a garter spring or o-ring, which is recessed in a radially outer surface 596 of locking member segments 590a.

In the illustrated embodiment, a release sleeve 552 is moveably secured to second member 524 proximate receiving end 564. In a particular configuration, release sleeve 552 is generally U-shaped having a first end 553, which contacts locking segments 590a to prevent them from falling out of groove 570 prior to insertion of first member 522, and a second end 555 used to secure release sleeve 552 to second member 524 (see FIG. 18). It will be appreciated that release sleeve 552 is not limited to the design shown, and may include other configurations that are adaptable for use on second member 524.

A resiliently compressible member 557, such as a compression spring, is disposed between second member 524 and release sleeve 552 to bias release sleeve 552 in an axial direction away from second member 524 (to the right in FIGS. 17-19). First end 553 may be tapered to allow release sleeve 552 to cam against locking member 590 as release sleeve 552 is pushed into second member 524. The tapered walls 575 of groove 574 force locking member 590 to move radially outward when engaged by release sleeve 552. Once assembled onto second member 524, release sleeve 552 is sealingly engaged by annular sealing member 584.

First member 522 includes a first exterior surface 526 and a second exterior surface 542 that is separated from first exterior surface 526 by retaining formation 544. In the illustrated embodiment, retaining formation 544 includes a ramp 546 that extends outward from first exterior surface 526 and at least two grooves 537 formed in second exterior surface 542. Grooves 537 are at least partially defined by converging surfaces 539 and 541 that meet at an apex. In a particular configuration, surface 541 is substantially perpendicular to second exterior surface 542 or slightly tapered relative thereto, such that shoulder 594 on locking member segment 590a become engaged against surface 541 when first 522 and second 524 members are connected.

First member 522 also includes at least one annular sealing member 587 disposed in second exterior surface 542, and an optional support ring 588. Annular sealing member 587 seals against release sleeve 552 when first member 522 is inserted a predetermined distance into second member 524.

When first member 522 is inserted into second member 524, locking member segments 590a are pushed into groove 574. As soon as the first tooth on locking member segments 590a cams or "ratchets" over ramp 546 on retaining formation 544, locking member segments 590a are biased radially inward by resilient member 589 into a groove 537 in the retaining formation to become positioned between converging surface 541 and the second tapered surface 575. In this position, first member 522 is retained in second member 524, but not necessarily sealingly connected. This lack of a seal tight connection is visually obvious because annular sealing member 587 in first member 522 is exposed (see, e.g., FIG. 17). If coupling assembly 520 were pressurized at this point, there would be fluid leakage between the first 522 and second 524 members, but not a "blow-off" (i.e., separation of first member 522 from second member 524).

As first member 522 is pushed further into second member 524, locking member segments cam or "ratchet" over the apex of additional grooves and sealing member 587 becomes engaged against release sleeve 544 to prevent fluid leakage and inhibit the ingression of dust and other debris into the coupling assembly. Full connection of first member 522 with second member 524 is verified by sealing member 587 becoming hidden under release sleeve 552. Upon pressurization of the fully connected coupling assembly, the slight taper in surfaces 541 cause locking member segments 590a to tighten against retaining formation 544 and provide a robust connection between first member 522 and second member 524.

To release first member 522 from second member 524, as shown in FIG. 19, release sleeve 544 is pushed toward second member 524 to force locking member segments 590a into groove 574. Once segments 590a are moved far enough into groove 574, first member 522 is free to be removed from second member 524.

Referring to FIGS. 21-23, an alternate embodiment of coupling assembly 520 is shown (denoted by reference numeral 520'). In this embodiment, retaining formation 544' on first member 522' includes two or more annular grooves 537'. Each groove 537' is defined by a pair of converging surfaces 539' that extend radially inward from second exterior surface 542'. Positioned to be received within grooves 537' are balls 590b, which replace locking member segments 590a. Balls 590b are biased against a chamfer 575' of groove 574' by a resilient member 589', such as, for example, a spiral wound retaining ring or a garter spring. Alternatively, a split locking ring, similar to split locking ring 90 shown in FIGS. 1 and 2, may be substituted in place of balls 590b and resilient member 589'.

Prior to insertion of first member 522' into second member 524', balls 590b are held within second member 524' by release sleeve 552' and a retaining member 597' that is secured within receiving portion 570' of second member 524 proximate groove 574'. Resilient member 589' wants to radially contract, and in doing so is forced against balls 590b by the tapered end of retaining member 597'. As first member 522' is inserted into second member 524', balls 590b are pushed into groove 574' against the biasing force of resilient member 589' by a ramp 546' on first member 522'. As soon as the first groove 537' aligns radially with balls 590b, balls 590b are biased radially inward into groove 537' to become positioned between a converging surface 539' and chamfer 575' to retain first member 522' within second member 524'. This partial connection is visually obvious because sealing member 587' in first member 522 is exposed (see, e.g., FIG. 21). As first member 522' is pushed further into second member 524', as shown in FIG. 22, balls 590b progressively cam over surfaces 539' and are biased into another groove 537' while sealing member 587' becomes sealed against release sleeve 552'. To release first member 522' from second member 524', as shown in FIG. 23, release sleeve 552' is pushed toward second member 524' (to the left in FIG. 23), forcing balls 590b into groove 574' against the biasing force of resilient member 589'.

Figure 24:
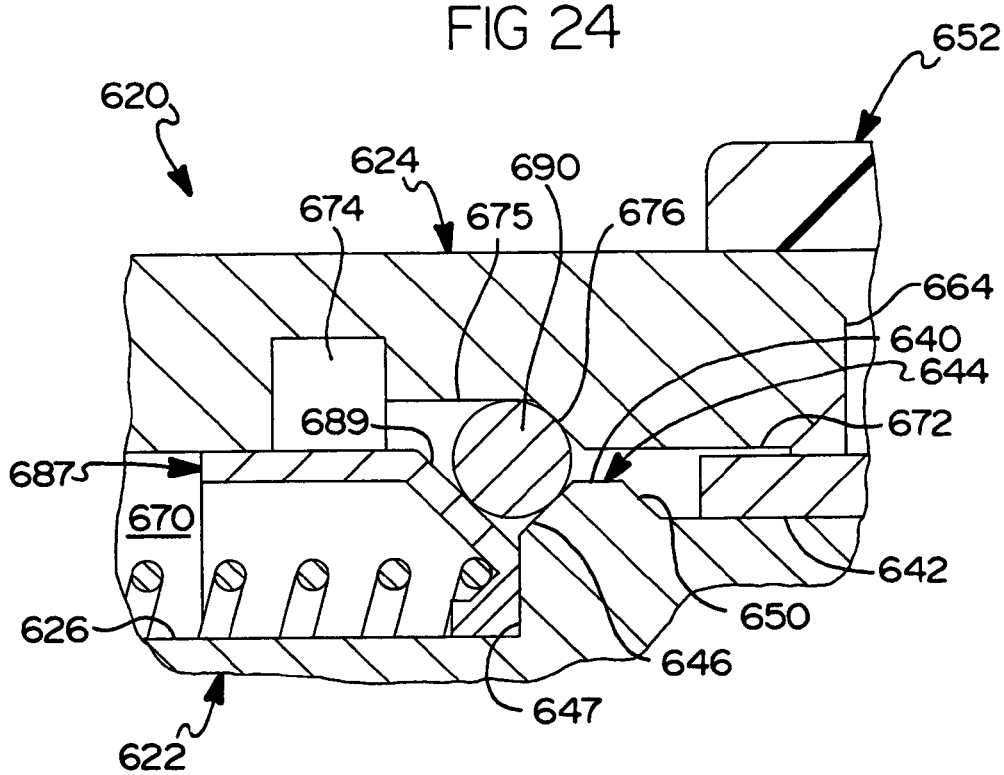
FIGS. 24-26 are cross-sectional views of a coupling assembly according to another embodiment of the present invention, showing various stages of connection.
Figure 25:
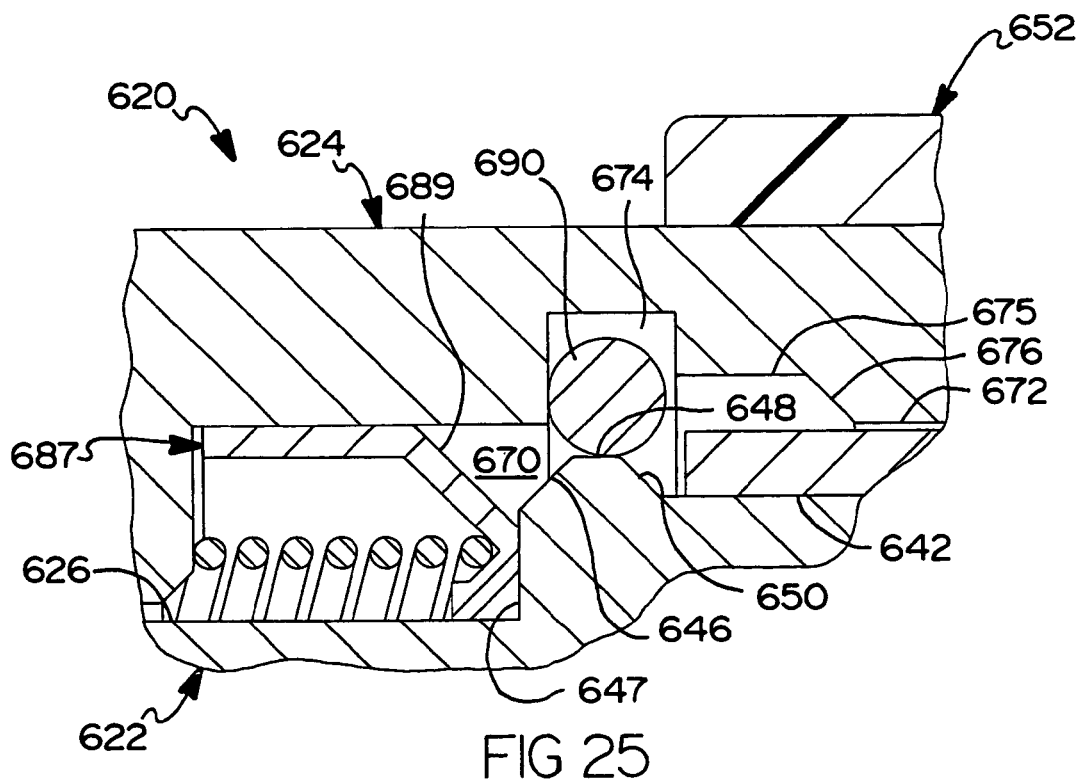
Figure 26:
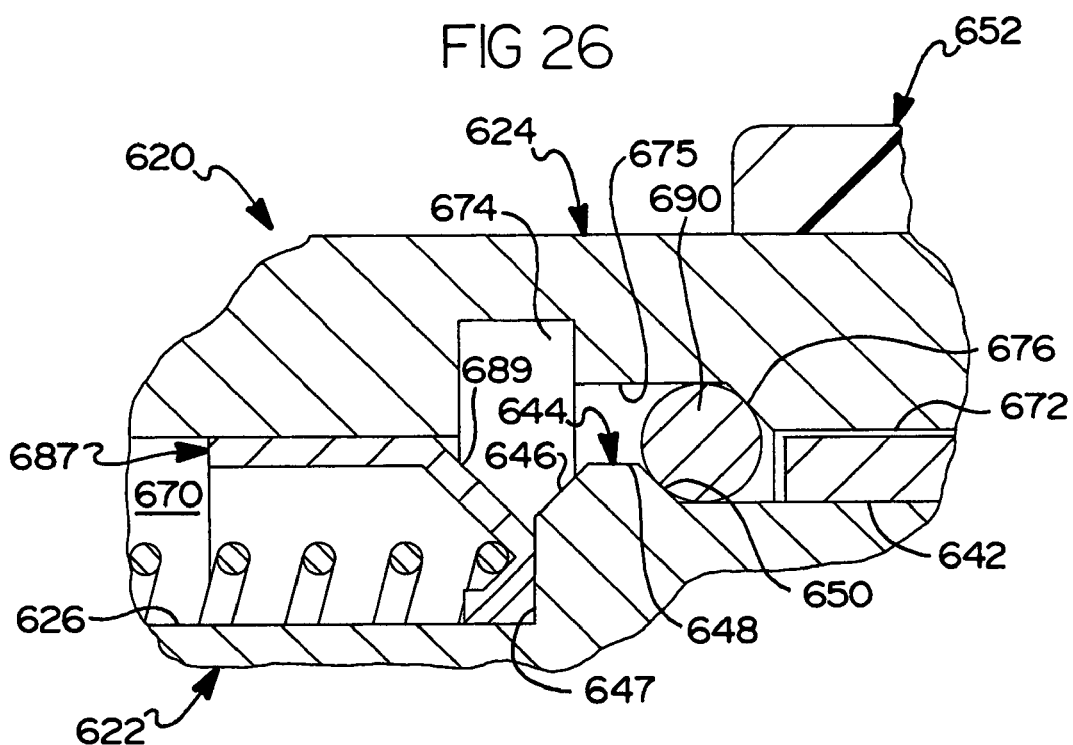

Referring to FIGS. 24-26, another embodiment of the present invention is shown. In this embodiment, a first member 622 is provided that includes a first exterior surface 626 that is separated from a second exterior surface 642 by a retaining formation 644. Retaining formation 644 includes a tapered ramp 646 that extends from a surface 647, generally perpendicular to first exterior surface 626, to a cylindrical surface 648 that is substantially parallel to second exterior surface 642. Surface 648 extends away from ramp 646 until it meets a shoulder 650 that tapers inwardly to second exterior surface 642. Alternatively, ramp 646 may extend outwardly to an apex (not shown) where it meets shoulder 650.

A second member 624 is provided that includes a receiving portion 670, which extends from receiving end 664, and an inner cylindrical surface 672 having a first inwardly facing annular groove 674 extending radially outwardly therefrom. An intermediate surface 675 extends from groove 674 to a chamfer 676. Chamfer 676 extends inwardly from intermediate surface 675 toward receiving end 664 until it meets first interior cylindrical surface 672. Alternatively, a second annular groove (see, e.g., U.S. Pat. No. 5,570,910), having a slightly smaller diameter than first annular groove 674, may be provided adjacent first annular groove 674 in place of intermediate surface 675 and chamfer 676. Additionally, chamfer 676 may extend directly from first annular groove 674 without an intermediate surface 675.

In an embodiment, a spring-loaded cylindrical sleeve 687 is moveably positioned within receiving portion 670. In a disconnected state, sleeve 687 biases a locking member 690, such as a split locking ring, against chamfer 676. In the illustrated embodiment, sleeve 687 includes a tapered forward surface 689 that engages locking member 690. Tapered surface 689 and chamfer 676 may converge toward receiving end 664 to prevent locking member 690 from falling out of second member 622 in the disconnected state.

When first member 622 is inserted into second member 624, the forward facing shoulder 647 of retaining formation 644 engages sleeve 687 and pushes sleeve 687 and locking member 690 axially within receiving portion 670 until locking member 690 is radially aligned with groove 674 in second member 624. Once aligned with groove 674, locking member 690 is free to expand as it travels over ramp 646 and surface 648 (see, e.g., FIG. 25). If first member 622 is inserted far enough into second member 624, locking member 690 contracts between shoulder 650 and chamfer 676 to connect first member 622 to second member 624 (see, e.g., FIG. 26). If first member 622 is not inserted far enough into second member 624 to permit locking member 690 to contract behind shoulder 650, first member 622 will be ejected from second member 624 by spring-loaded sleeve 687. Accordingly, the state of disconnection is clearly indicated when first member 622 is ejected from second member 624.

To release first member 622 from second member 624 once connected, a release sleeve 652 is pushed toward second member 624 to force locking member 690 to expand into groove 674. Once locking member 690 is expanded over retaining formation 644, first member 622 is free to be removed from second member 624.

Referring to FIGS. 27-30, another embodiment of the present invention is shown. In this embodiment, a coupling assembly 720 is provided that includes a first member 722 and a second member 724. First member 722 includes an annular cavity 737 that extends inwardly from first exterior surface 726. A locking member 789 is moveably received in cavity 774. In a particular embodiment, locking member 789 includes a number of individual locking member segments 789a disposed around an inward circumferential surface of cavity 737. Each individual locking member segment 789a is generally triangular in cross-section having a tapered ramp 791 that extends to an apex 793 where it meets a shoulder 795. A resiliently compressible member 743, such as, for example, an o-ring (shown in FIGS. 27-29) or garter spring, is disposed between locking member segments 789a and the inner circumferential surface of cavity 737. Resiliently compressible member 743 allows locking member segments 789a to pivot into cavity 737 during insertion of first member 722 into second member 724 and biases locking member segments 789a radially outward after first 722 and second 724 members are at least partially connected. First member 722 includes a lip 739 that extends axially into a portion of cavity 737 to retain locking member segments 789a within cavity 737 prior to insertion of first member 722 into second member 724.

First member 722 also includes a release sleeve 752 moveably mounted on second exterior surface 742. While release sleeve 752 is shown generically in FIGS. 27-29 as merely including a rigid L-shaped release member 754, other release sleeve design may also be used with first member 722, such as release sleeve 52 shown in FIGS. 1 and 2. A locking member 767, such as a locking ring, is secured in second exterior surface 742 between release sleeve 752 and support surface 740. Locking member 767 limits sliding movement of release sleeve 752 in a direction toward support surface 740 to ensure leading edge 759 of release sleeve 752 overlaps a portion of locking member segments 789a. This overlap prevents locking member segments 789a from falling out of cavity 737 prior to insertion of first member 722 into second member 724.

Figure 30:
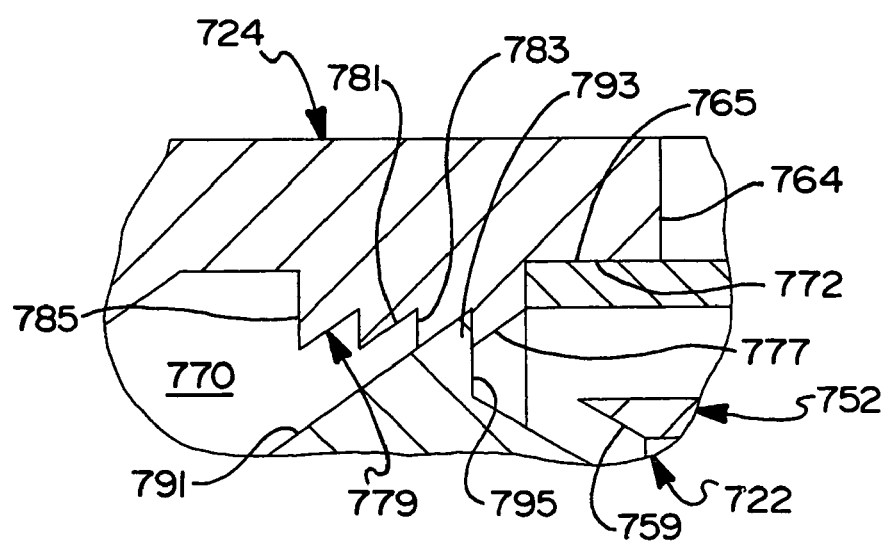
FIG. 30 is a detail view of the coupling assembly shown in FIG. 27.

Referring to FIG. 30, second member 724 includes a receiving portion 770 having a first inner cylindrical surface 772 that extends from receiving end 764. A shoulder 765 extends radially inward from cylindrical surface 772 to a ramp 777 that tapers inwardly and away from receiving end 764. Adjacent ramp 777 are two or more radially outwardly directed grooves 779 that are sized to accept apex 793 of locking member segments 789a. Each groove 779 includes converging surfaces, including a first or tapered surface 781 that is generally parallel to ramp 776 and a second surface 783 that is generally parallel to shoulder 765 or slightly tapered.

A resiliently compressible member 797, such cylindrical rubber sleeve, is disposed between second member 724 and release sleeve 752 to seal against the ingression of dirt and other debris when first and second members 522, 524 are connected. Resiliently compressible member 797 may also function to bias release sleeve 752 in an axial direction away from second member 724 (to the right in FIGS. 27-29).

As first member 722 is inserted into second member 724, locking member segments 789a engage ramp 777 and are forced to pivot into cavity 737 against the biasing force of resiliently compressible member 743. Upon further insertion of first member 722 into second member 724, each locking member segment 789a pivots radially outward into the first of grooves 779 relative to receiving end 764. Once received in the first of grooves 779, first member 722 is retaining within second member 724. If coupling assembly 720 were pressurized at this point, there may be fluid leakage (if first exterior surface 726 is not yet sealingly engaged with annular sealing member 784), but not a "blow-off" of first member 722 from second member 724.

If, however, first member 722 is not pushed far enough into second member 724 for locking member segments 789a to be received in the first of grooves 779, first member 722 may be ejected from second member 724 by the force of resiliently compressible member 797 disposed between shoulder 765 and release sleeve 752. The ejection of first member 722 from second member 724 provides a tactile and visual indication that the coupling members are not connected.

As first member 722 is pushed further into second member 724, locking member segments 789a are progressively received in additional grooves 779 until the number of grooves 779 are exhausted and locking member segments 789a "bottom out" in receiving portion 770 (see, e.g., FIG. 28). Once "bottomed out," shoulder 795 of locking member segments 789a is engageable with a radially outward extending surface 785 to lock first member 722 within second member 724. This design requires a relatively low axial force to connect the coupling members, especially when compared to the prior art design shown in FIGS. 1 and 2. The progressive receipt of locking member segments 789a into grooves 779 and the subsequent "bottoming-out" of locking member segments 789a within receiving portion 770 also provides a tactile indication that the coupling assembly is connected.

When it is desired to disconnect first member 722 from second member 724, a release sleeve 752 is moved in a direction toward second member 724 (to the left in FIG. 29). As noted above, a tool may be used for additional leverage between a support surface 740 and release sleeve 752. The leading edge 759 of release sleeve 752 engages each of locking member segments 789a, forcing them to pivot into cavity 737. Once locking member segments 789a are free to pass by grooves 779, first member 722 may be removed from second member 724.

Figure 31:
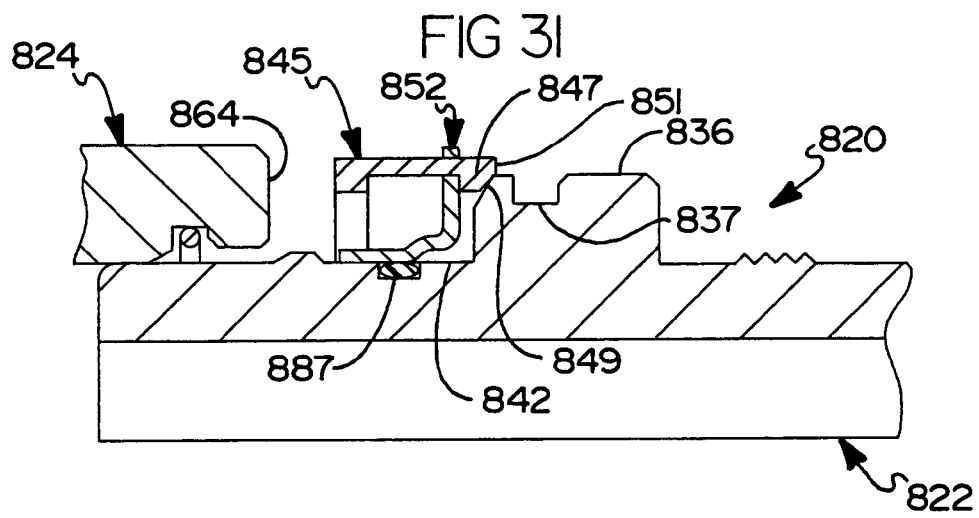
FIGS. 31-33 are cross-sectional views of a coupling assembly according to another embodiment of the present invention, showing various stages of connection.
Figure 32:
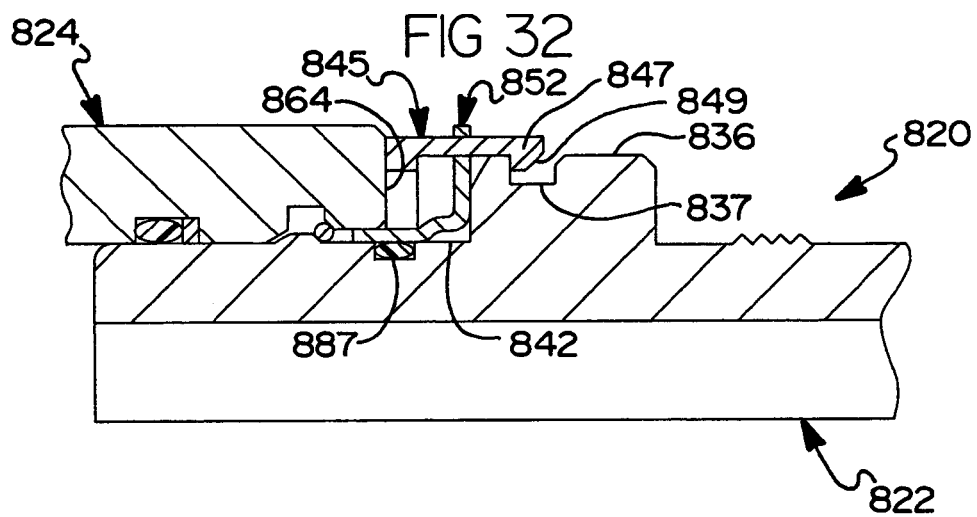
Figure 33:
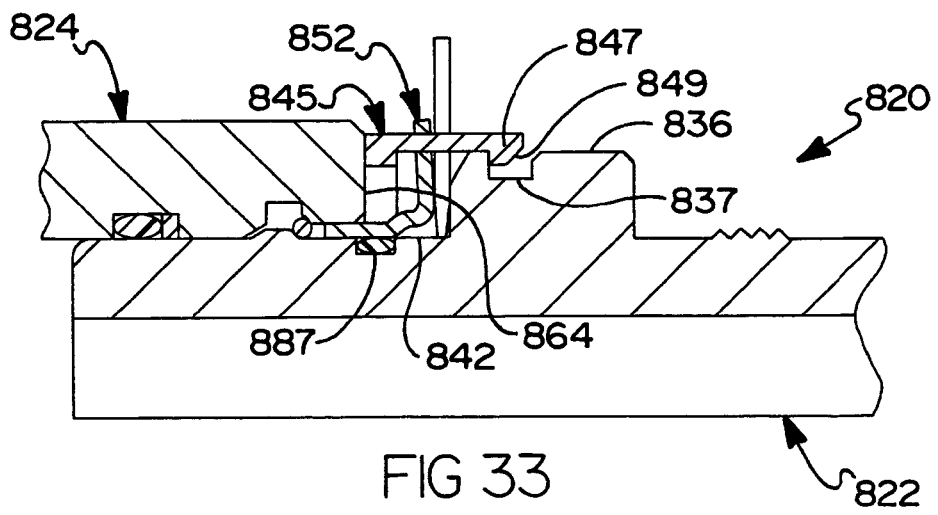

Referring to FIGS. 31-33, another embodiment of the present invention is shown. In this embodiment, a coupling assembly 820 is provided that includes a first member 822 and a second member 824 that are substantially similar to first 22 and second 24 members shown above in FIGS. 1 and 2. First member 822 includes a release sleeve 852 moveably disposed on second exterior surface 842. Radially outward of release sleeve 852 is a cylindrical indicator sleeve 845 through which at least a portion of release sleeve 852 projects. Indicator sleeve 845 includes a locking portion 847 having a chamfer 849 that extends radially inward and away from a distal end 851 of indicator sleeve 845. First member 822 also includes a collar 836 having a radially inwardly extending annular groove 837 sized to receive locking portion 847. Optionally, an annular sealing member 887 may be disposed between second exterior surface 842 and release sleeve 852 to inhibit the ingression of dust and other debris.

Indicator sleeve 845 is permitted to move independently of release sleeve 852 and is designed to verify when first member 822 is "connected" to second member 824. As first member 822 is inserted into second member 824, indicator sleeve 845 engages receiving end 864 and is forced to expand over collar 836 and then contract into groove 837 (see, e.g., FIG. 32), to provide a visual and tactile indication the coupling members are connected. Due to the inherent axial movement of first member 822 within second member 824 during connection, indicating sleeve 845 may not be fully received in groove 837, when in fact first 822 and second 824 members are truly "connected." However, indicator sleeve 845 is designed such that it will not be received in groove 837 if in fact first 822 and second 824 members are not "connected." As noted above, a release tool may used to disconnect first member 822 from the second member, by inserting the tool through the portion of indicating sleeve 845 where release sleeve 852 extends (see, e.g., FIG. 33).

Figure 34:
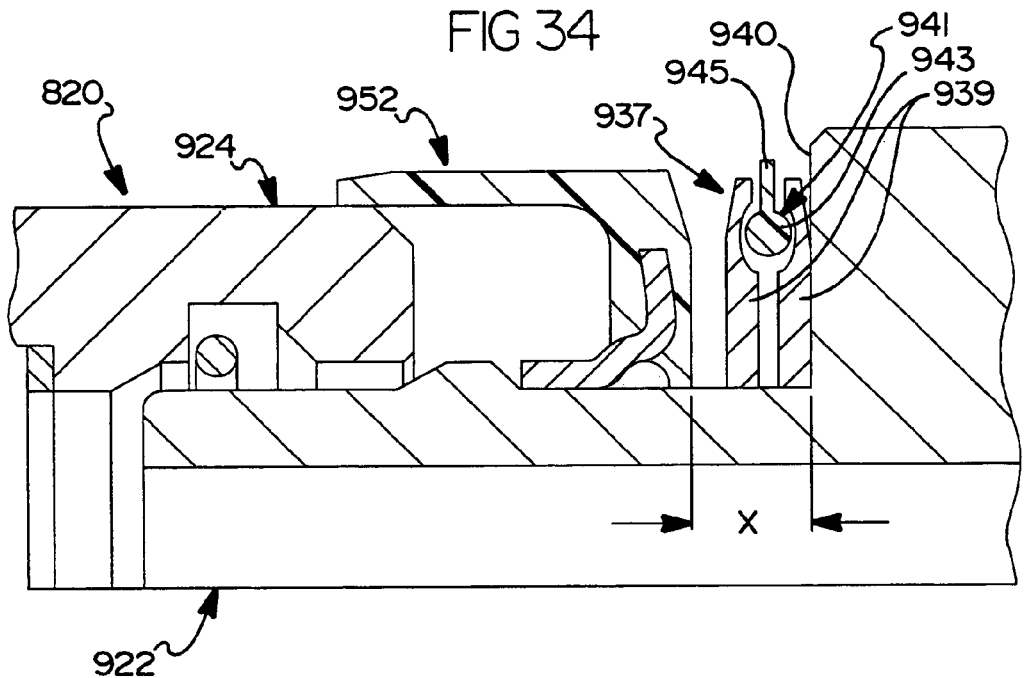
FIGS. 34 and 35 are cross-sectional views of a coupling assembly according to another embodiment of the present invention, showing two stages of connection.
Figure 35:
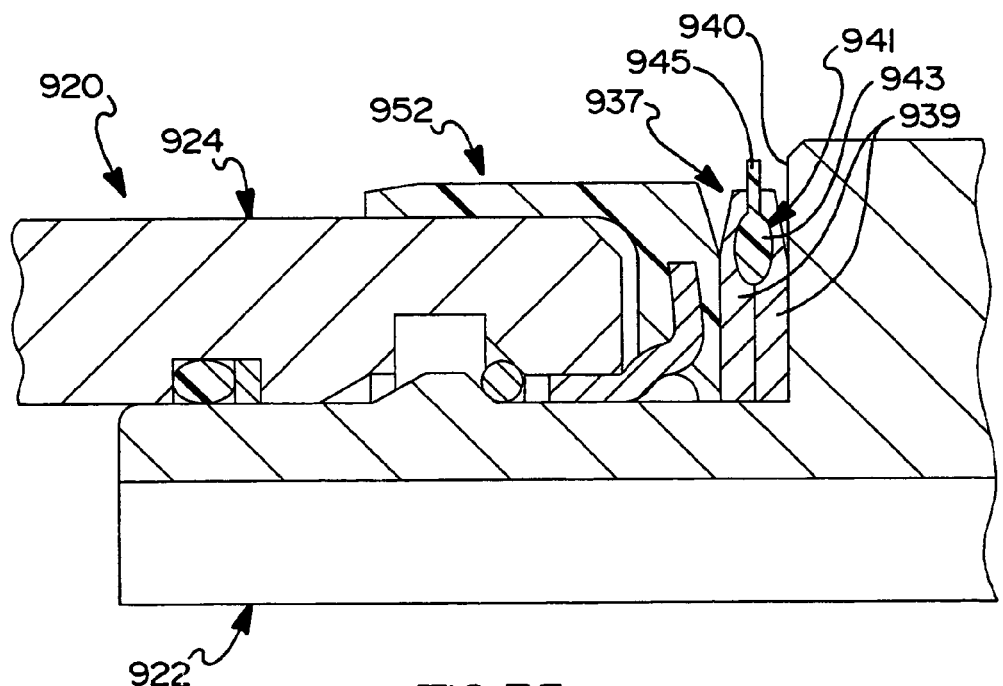

Referring to FIGS. 34 and 35, another embodiment of the present invention is shown. In this embodiment, a coupling assembly 920 is provided that includes a first member 922 and a second member 924 that are substantially similar to first 22 and second 24 members shown in FIGS. 1 and 2. First member 922 includes a release sleeve 952 moveably disposed on second exterior surface 942. An indicating member 937 is provided in a gap (X) located between release sleeve 952 and a support surface 940. In an embodiment, indicating member 937 includes two annular discs 939 that sandwich a resiliently compressible tab 941 therebetween. Tab 914 includes a bulbous portion 943 and an indicating portion 945 that extends radially outwardly therefrom.

As first member 922 is inserted into second member 924, gap (X) is reduced causing release sleeve 952 to apply a compressing force against indicating member 937. When first member 922 is connected to second member 924 (see, e.g., FIG. 35), the compressing force against indicating member 937 is sufficient to compress tab 941 and force indicating portion 945 radially outwardly from between discs 939, providing a visual and tactile indication that first member 922 is connected to second member 924.

In an alternative embodiment, one or both discs 939 are removed from indicating member 937, leaving compressible tab 941 to be positioned between support surface 940 and a disc 939, release sleeve 952 and a disc 939 or release sleeve 952 and support surface 940. In another alternative embodiment, indicator 937 does not include a tab 941 between annular discs 939. Instead, discs 939 are merely pressed against one another to reduce the space therebetween and provide a visual indication that first member 922 is connected to second member 924.

Figure 36:
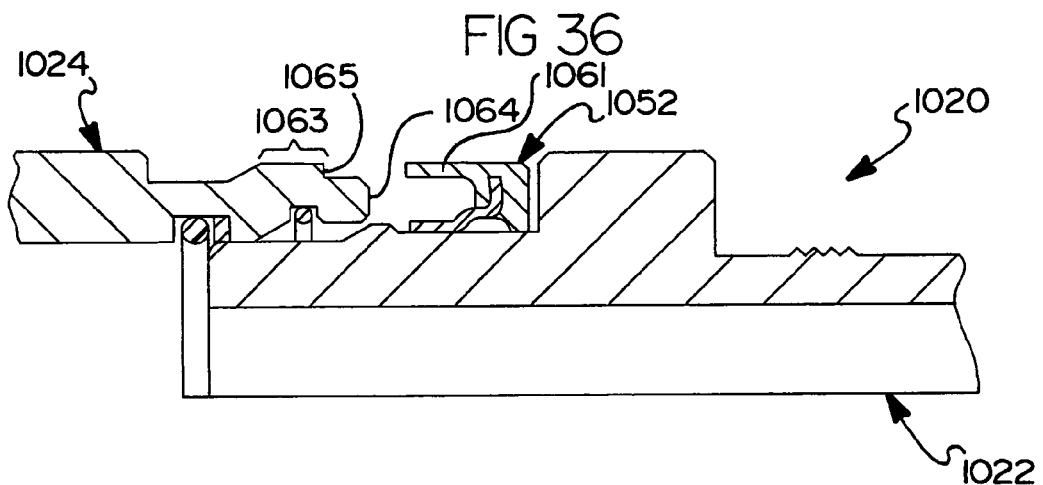
FIGS. 36-38 are cross-sectional views of a coupling assembly according to another embodiment of the present invention, showing various stages of connection.
Figure 37:
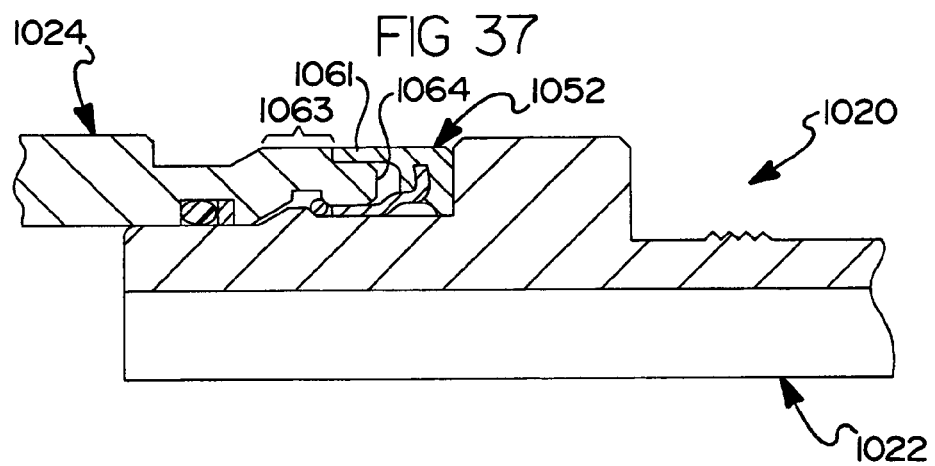
Figure 38:
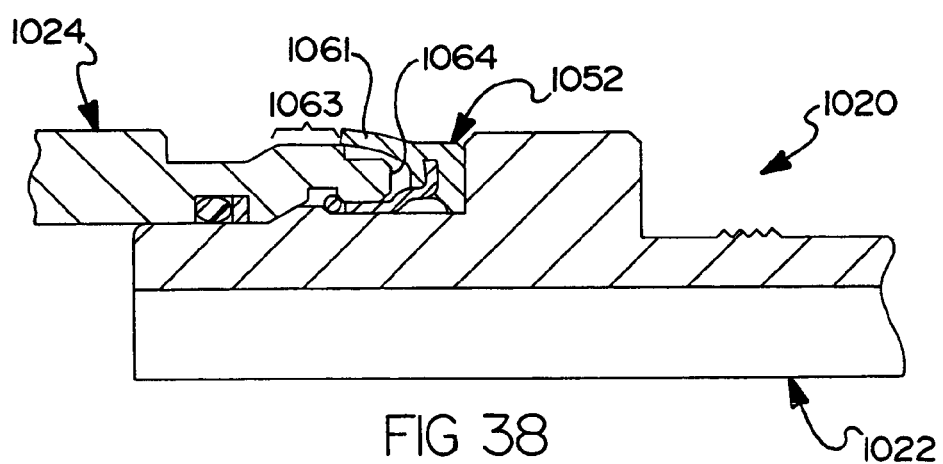

Referring to FIGS. 36-38, there is shown another embodiment of the present invention. In this embodiment, a coupling assembly 1020 is provided that includes a first member 1022 and a second member 1024. First member 1022 is substantially similar to first member 22 shown above in FIGS. 1 and 2. Second member 1024 is substantially similar to second member 24 with at least one exception, namely, an outer surface of second member 1024 includes a radially outwardly extending ridge 1063 proximate receiving end 1064. The rearward face 1065 of ridge 1063 is removed from receiving end 1064 a predetermined distance to permit flexible wall portion 1061 of release sleeve 1052 to abut ridge 1063 when first member 1022 is connected to second member 1024.

When first member 1022 is partially received within second member 1024, as shown in FIG. 36, a gap is present between release sleeve 1052 and second member 1024, particularly ridge 1063, to visually indicate first member 1022 is not connected to second member 1024. However, as shown in FIG. 37, when first member 1022 is connected to second member 1024, flexible wall portion 1061 abuts rearward face 1065 of ridge 1063 providing a visual indication that coupling assembly 1020 is connected and ready for use.

As noted above, a predetermined degree of over-travel may be built into coupling assembly 1020, which allows first member 1022 to be inserted further into second member 1022 a distance beyond that need to connect the members. This additional over-travel allows flexible wall portion 1061 to be pushed up onto ridge 1063 when first member 1020 is "bottomed-out" in second member 1024 (see, e.g., FIG. 38). As shown in FIG. 38, the outwardly flared flexible wall portion 1061 provides a visual and tactile indication that first member 1022 is connected to second member 1024.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A coupling assembly comprising:
   a first member;
   a second member having a receiving portion sized to receive the first member;
   a retaining formation provided on one of the first and second members, the retaining formation including a ramp and two or more grooves, wherein each groove is at least partially defined by converging surfaces;
   a locking member moveably secured in a cavity in the other of the first and second members;
   a resilient biasing member adapted to engage and bias the locking member in a first radial direction, wherein the resilient biasing member is an o-ring or a garter spring; and
   a moveable release sleeve configured for receipt within the receiving portion of the second member between the first member and the second member,
   wherein, as the first member is progressively inserted into the receiving portion of the second member, the locking member is moved:
      in a second radial direction, opposite the first radial direction, by the ramp against the urging of the biasing member,
      in the first radial direction, due to the bias of the biasing member, to engage one of the grooves in the retaining formation,
      in the second radial direction by one of the converging surfaces against the urging of the biasing member, and
      in the first radial direction, due to the bias of the biasing member, to engage the other groove in the retaining formation, and
   wherein the moveable release sleeve is configured to be moved into engagement with the locking member, when the locking member is engaged with the other groove in the retaining formation, and move the locking member in the second radial direction.

2. The coupling assembly of claim 1, wherein the locking member includes a number of locking member segments.

3. The coupling assembly of claim 2, wherein the locking member segments are moveably secured to the first member.

4. A coupling assembly comprising:
   a first member extending along an axis from a leading end to a trailing end, a first exterior surface extending from the leading end and a second exterior surface spaced from the first exterior surface by a retaining formation, the retaining formation including a ramp extending outward from the first exterior surface and at least two grooves;
   a second member having a receiving end and a receiving portion sized to receive the first member, the receiving portion including a first inwardly facing cylindrical surface adjacent the receiving end sized to receive the retaining formation of the first member, and an inwardly facing annular groove including a chamfer extending radially outward from the cylindrical surface and away from the receiving end; and
   a ratcheting locking member moveably received within the inwardly facing annular groove of the second member and sized to receive the first exterior surface of the first member;
   a resilient biasing member adapted to engage and bias the ratcheting locking member radially inward,
      wherein, upon movement of the first member into the receiving portion of the second member, the ratcheting locking member is moved radially outward by the ramp against the urging of the biasing member,
      wherein, upon further movement of the first member into the receiving portion of the second member, the ratcheting locking member progressively engages the at least two grooves in the retaining formation;
   a moveable release sleeve configured to be moved into engagement with the ratcheting locking member, when the ratcheting locking member is engaged with the at least two groove in the retaining formation, and move the ratcheting locking member radially outward; and
   an annular sealing member disposed between and in contact with both the first member and the release sleeve when the first member is fully inserted into the second member.

5. The coupling assembly of claim 4, wherein the locking member is a split locking ring.

6. The coupling assembly of claim 4, wherein the locking member includes a number of locking member segments.

7. The coupling assembly of claim 4, wherein the resilient biasing member includes an o-ring disposed in an outwardly facing groove in an outer surface of the ratcheting locking member.

8. A coupling assembly comprising:
   a first member extending along an axis from a leading end to a trailing end, a first exterior surface extending from the leading end and a second exterior surface spaced from the first exterior surface by a retaining formation, the retaining formation including a ramp extending outward from the first exterior surface and at least two axially spaced apart grooves;
   a second member having a receiving end and a receiving portion sized to receive the first member, the receiving portion including a first inwardly facing cylindrical surface adjacent the receiving end and sized to receive the retaining formation of the first member, and an inwardly facing annular groove including spaced apart first and second tapered surfaces extending outwardly from first inwardly facing cylindrical surface; and a locking member moveably received within the inwardly facing annular groove of the second member, the locking member sized to receive the first exterior surface of the first member;

a resilient biasing member adapted to engage and bias the locking member radially inward, wherein the resilient biasing member is a garter spring disposed in an outwardly facing groove in an outer surface of the locking member, wherein, during insertion of the first member into the receiving portion of the second member, the locking member moves in alternating radial directions to progressively engage the at least two grooves in the retaining formation; and a moveable release sleeve configured to be moved into engagement with the locking member, when the locking member is engaged with the at least two groove in the retaining formation, and move the locking member radially outward.

9. A coupling assembly comprising:

a first member extending along an axis from a leading end to a trailing end, a first exterior surface extending from the leading end and a second exterior surface spaced from the first exterior surface by a retaining formation, the retaining formation including a ramp extending outward from the first exterior surface and at least two grooves;

a second member having a receiving end and a receiving portion sized to receive the first member, the receiving portion including a first inwardly facing cylindrical surface adjacent the receiving end sized to receive the retaining formation of the first member, and an inwardly facing annular groove including a chamfer extending radially outward from the cylindrical surface and away from the receiving end; and a ratcheting locking member moveably received within the inwardly facing annular groove of the second member and sized to receive the first exterior surface of the first member;

a resilient biasing member adapted to engage and bias the ratcheting locking member radially inward, wherein, upon movement of the first member into the receiving portion of the second member, the ratcheting locking member is moved radially outward by the ramp against the urging of the biasing member, wherein, upon further movement of the first member into the receiving portion of the second member, the ratcheting locking member progressively engages the at least two grooves in the retaining formation;

a moveable release sleeve configured to be moved into engagement with the ratcheting locking member, when the ratcheting locking member is engaged with the at least two groove in the retaining formation, and move the ratcheting locking member radially outward; and an annular sealing member disposed between and in contact with both the second member and the release sleeve.

\* \* \* \* \*